United States Patent
Horie et al.

(10) Patent No.: US 6,480,624 B1
(45) Date of Patent: Nov. 12, 2002

(54) COLOR DISCRIMINATION APPARATUS AND METHOD

(75) Inventors: Daisaku Horie, Kyoto; Noriyuki Okisu, Osakasayama, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/163,266

(22) Filed: Sep. 29, 1998

(30) Foreign Application Priority Data

| | | |
|---|---|---|
| Sep. 30, 1997 | (JP) | 9-267444 |
| Sep. 30, 1997 | (JP) | 9-267445 |
| Sep. 30, 1997 | (JP) | 9-267446 |
| Sep. 30, 1997 | (JP) | 9-267447 |

(51) Int. Cl.[7] .............................................. G06K 9/00
(52) U.S. Cl. ..................... 382/165; 382/163; 382/162; 358/1.9; 358/518
(58) Field of Search ..................... 382/165, 162, 382/163; 396/305; 348/713; 358/1.9, 218, 518, 403, 524

(56) References Cited

U.S. PATENT DOCUMENTS

| | | | | |
|---|---|---|---|---|
| 4,929,979 A | * | 5/1990 | Kimoto et al. | 355/38 |
| 5,031,034 A | * | 7/1991 | Shimizu et al. | 358/79 |
| 5,109,274 A | * | 4/1992 | Washio et al. | 358/80 |
| 5,357,354 A | * | 10/1994 | Matsunawa et al. | 358/530 |
| 5,359,438 A | * | 10/1994 | Maeda | 358/539 |
| 5,377,019 A | * | 12/1994 | Okisu et al. | 358/464 |
| 5,483,361 A | * | 1/1996 | Shimizu et al. | 358/529 |
| 5,586,197 A | * | 12/1996 | Tsujimura et al. | 382/162 |
| 5,608,549 A | * | 3/1997 | Usami | 358/530 |
| 5,987,265 A | * | 11/1999 | Iwasaki | 396/225 |
| 6,047,085 A | * | 4/2000 | Sato et al. | 382/165 |
| 6,160,593 A | * | 12/2000 | Nakakuki | 348/713 |

FOREIGN PATENT DOCUMENTS

| | | | | |
|---|---|---|---|---|
| JP | 5048892 | * | 2/1993 | H04N/1/40 |
| JP | 5-048892 | | 2/1993 | |
| JP | 5-067209 | * | 3/1993 | G06F/15/70 |
| JP | 5-137011 | * | 6/1993 | H04N/1/46 |
| JP | 5298443 | * | 11/1993 | H04N/1/46 |
| JP | 5-298443 | | 11/1993 | |

* cited by examiner

*Primary Examiner*—Edward Coles
*Assistant Examiner*—Tia A Carter
(74) *Attorney, Agent, or Firm*—Sidley Austin Brown & Wood LLP

(57) ABSTRACT

A color discriminating apparatus is provided with: a luminance calculator for calculating luminance information of a picked up color image based on image data of each of a plurality of color components constituting the color image; a color information calculator for calculating color information of the color image based on image data; a first discriminator for discriminating, based on calculated color information, which the color image is chromatic or achromatic; a second discriminator for discriminating, based on calculated luminance information, which the color image is black or white when the color image is discriminated to be achromatic; and a third discriminator for discriminating, based on the calculated color information and the calculated luminance information, which of a plurality of predetermined colors the color image agrees with when the color image is discriminated to be chromatic.

25 Claims, 22 Drawing Sheets

$$p_1 = 23/(4^2+4^2+5^2+6^2+4^2) = 0.211$$

$$p_2 = 25/(17^2+2^2+3^2+1^2+2^2) = 0.081$$

COLOR DISCRIMINATION APPARATUS AND METHOD

This application is based on patent application Nos. 9-267444, 9-267445, 9-267446, and 9-267447 filed in Japan, the contents of which is hereby incorporated by reference.

BACKGROUND OF THE INVENTION

This invention relates to a color discriminating apparatus and method for discriminating the color of a sensed image using image data of color components of red, green, blue, etc.

A known method for discriminating colors of an image represented by an electrical signal is such that the colors are discriminated using normalized data of color component data constituting the image.

For example, Japanese Unexamined Patent Publication No. 5-48892 discloses a color discrimination method according to which specified threshold values c, m, y are set for image data C2, M2, Y2 of the respective color components of Cy (cyan), Mg (magenta), Ye (yellow) constituting an image and 8 colors can be discriminated against each other based on whether the image data C2, M2, Y2 are smaller or larger than the threshold values c, m, y. According to this method, the color of the image is discriminated to be black if all color components are smaller than the threshold values, while being discriminated to be a chromatic color when at least one color component is above at least one of the threshold values. In this method, however, it has been difficult to obtain an accurate chromatic-or-achromatic discrimination.

U.S. Pat. No. 5,377,019 discloses a color discrimination method using image data of color components R, G, B. Specifically, normalized data x(i) of respective image data (Xr, Xg, Xb) of three color components of red, green, blue is calculated in accordance with the equation $x(i)=X(i)/(Xr+Xg+Xb)$ (i=r, g, b). As shown in FIG. 36, two (e.g., red and green) of the three color components are selected and the color is discriminated against each other based on the position P of normalized data (xr, xg) of the two color components in the xr–xg plane of the selected color components. However, this discrimination method uses first power normalized data, which consequently makes it difficult to provide a clear discrimination when a difference between color component data is small.

Japanese Unexamined Patent Publication No. 5-137011 discloses a method according to which a difference between a maximum value and a minimum value of each of image data Xr, Xg, Xb of color components R, G, B is calculated, the color of an image is discriminated to be achromatic if the calculation results are smaller than a specified threshold value while chromatic colors are discriminated against each other based on a combination determined by the relationship of the image data Xr, Xg, Xb in magnitude if the calculation results are above the specified threshold value. In the case of an achromatic color, whether it is black or white is further discriminated based on luminance information.

In the use of luminance information, geometric shapes such as characters and/or graphics as an image content influence the color discrimination if the discrimination threshold value is fixed. As a result, lines of an image may be thicker or thinner than those of actual characters or graphics. For example, if a threshold value is set high, graphics or the like drawn on a white board in order not to convert portions of characters or graphic defined by thin lines or having a low density into white portions, characters and/or graphics defined by lines of normal width come to be defined by thick lines. As a result, these characters and/or graphics are undesirably deformed. Conversely, if the threshold value is set low, portions of characters or graphic defined by thin lines or having a low density are converted into white portions. Consequently, the resulting image undesirably lacks an information such as characters.

Also, in the case of raising the chromatic color discrimination level but lowering the chromatic-or-achromatic discrimination level, an achromatic color is likely to be wrongly discriminated to be a chromatic color. If such wrong discrimination frequently occurs in a single color area, the appearance of the single color area becomes very poor. Accordingly, wrongly discriminated portions are required to be removed as noise. Conventionally, noise removal is performed based on a major discriminated color in a specified area. However, such removal is not applicable to the case that there are many noises.

SUMMARY OF THE INVENTION

It is an object of the present invention to provide a color discriminating apparatus and method which have overcome the problems residing in the prior art.

According to an aspect of the invention, a color discriminating apparatus comprises: a first calculator which calculates luminance information of a picked up color image based on image data of each of a plurality of color components constituting the color image; a second calculator which calculates color information of the color image based on image data; a first discriminator which discriminates, based on calculated color information, which the color image is chromatic or achromatic; a second discriminator which discriminates, based on calculated luminance information, which the color image is black or white when the color image is discriminated to be achromatic by the first discriminator; and a third discriminator which discriminates, based on the calculated color information and the calculated luminance information, which of a plurality of predetermined colors the color image agrees with when the color image is discriminated to be chromatic by the first discriminator.

According to another aspect of the invention, a color discriminating apparatus comprises: a calculator which calculates normalized data x(i) of image data X(i) (i=1,2, . . . n) of each of a plurality of color components in accordance with the equation:

$$x(i)=X(i)^k/\{X(1)^k+X(2)^k+\ldots X(n)^k\} (k \geq 2),$$

each image data X(i) (i=1, 2, . . . n) constituting a picked up color image; and a color discriminator which discriminates the color of the color image based on calculated normalized data.

According to still another aspect of the invention, a color discriminating apparatus comprises: a luminance information calculator which calculates luminance information of each part of a picked up color image based on image data of a color component constituting the part of the color image; a color discriminator which discriminates which of colors the part of the color image has by comparing calculated luminance information with a discrimination reference; an area information generator which generates area information concerning which of a plurality of specified areas the part of the color image fall in; and a changer which changes the discrimination reference based on generated area information.

According to still yet aspect of the invention, a color discriminating apparatus comprises: a color discriminator which discriminates which of colors a part of a picked up color image has based on image data of each of a plurality of color components constituting the part of the color image; a color dispersion degree calculator which calculates a degree of color dispersion with respect to an extraction section consisting of a particular color discriminated part and a plurality of color discriminated parts surrounding the particular color discriminated part; a color dispersion degree discriminator which discriminates whether a calculated color dispersion degree is larger than a predetermined value; and a black allocater which allocates the color of black to the particular color discriminated part when the color dispersion degree is discriminated to be larger than the predetermined value.

According to further aspect of the invention, a method for discriminating the color of a picked up color image, comprises the steps of: calculating luminance information of a picked up color image based on image data of each of a plurality of color components constituting the color image; calculating color information of the color image based on image data; discriminating, based on calculated color information, which the color image is chromatic or achromatic; discriminating, based on calculated luminance information, which the color image is black or white when the color image is discriminated to be achromatic; and discriminating, based on the calculated color information and the calculated luminance information, which of a plurality of predetermined colors the color image agrees with when the color image is discriminated to be chromatic.

According to still further aspect of the invention, a method for discriminating the color of a picked up color image, comprises the steps of: calculating normalized data x(i) of image data X(i) (i=1,2, . . . n) of each of a plurality of color components in accordance with the equation:

$$x(i)=X(i)^k/\{X(1)^k+X(2)^k+\ldots X(n)^k\}(k \geq 2),$$

each image data X(i) (i=1, 2, . . . n) constituting a picked up color image; and discriminating the color of the color image based on calculated normalized data.

According to yet still further aspect of the invention, a method for discriminating the color of a picked up color image, comprises the steps of: calculating luminance information of each part of a picked up color image based on image data of a color component constituting the part of the color image; discriminating which of colors the part of the color image has by comparing calculated luminance information with a discrimination reference; generating area information concerning which of a plurality of specified areas the part of the color image fall in; and changing the discrimination reference based on generated area information.

According to more further aspect of the invention, a method for discriminating the color of a picked up color image, comprises the steps of: discriminating which of colors a part of a picked up color image has based on image data of each of a plurality of color components constituting the part of the color image; calculating a degree of color dispersion with respect to an extraction section consisting of a particular color discriminated part and a plurality of color discriminated parts surrounding the particular color discriminated part; discriminating whether a calculated color dispersion degree is larger than a predetermined value; and allocating the color of black to the particular color discriminated part when the color dispersion degree is discriminated to be larger than the predetermined value.

These and other objects, features and advantages of the present invention will become more apparent upon a reading of the following detailed description and accompanying drawings.

BRIEF DESCRIPTION OF THE DRAWINGS

FIGS. 25A to 25C show discrimination results when a black-or-white discrimination is made for characters or the like having different line widths using threshold profiles, wherein FIG. 25A shows a case where a threshold profile having a high threshold level is used, FIG. 25B shows a case where a threshold profile having a low threshold level is used, and FIG. 25C shows a case where the threshold level is changed according to the line width;

FIGS. 28A and 28B are charts showing calculation examples of a degree of dispersion, wherein FIG. 28A shows a degree of dispersion in a patched area and FIG. 28B shows a degree of dispersion in a red area;

DETAILED DESCRIPTION OF THE PREFERRED EMBODIMENTS OF THE INVENTION

Figure 1:
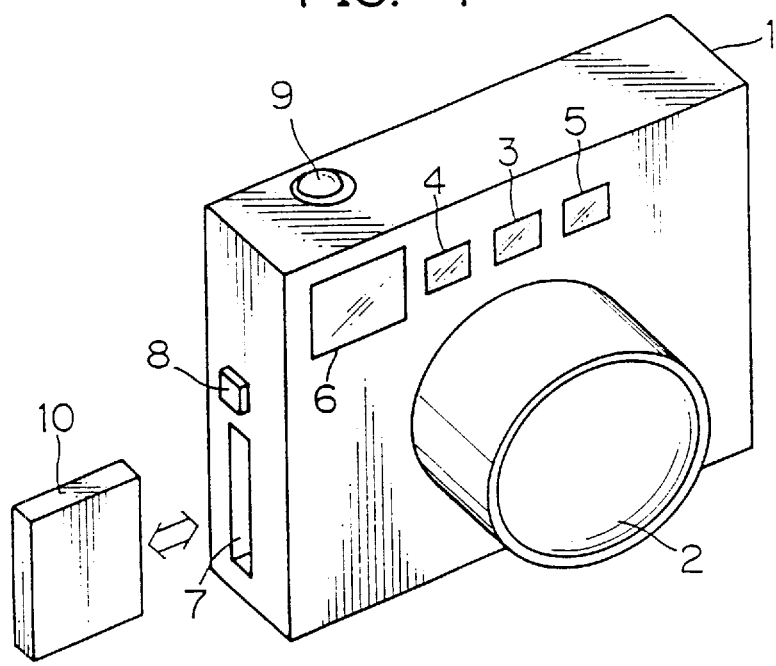
FIG. 1 is a perspective view showing an external configuration of an electronic camera provided with a color discriminating apparatus according to the invention.
Figure 2:
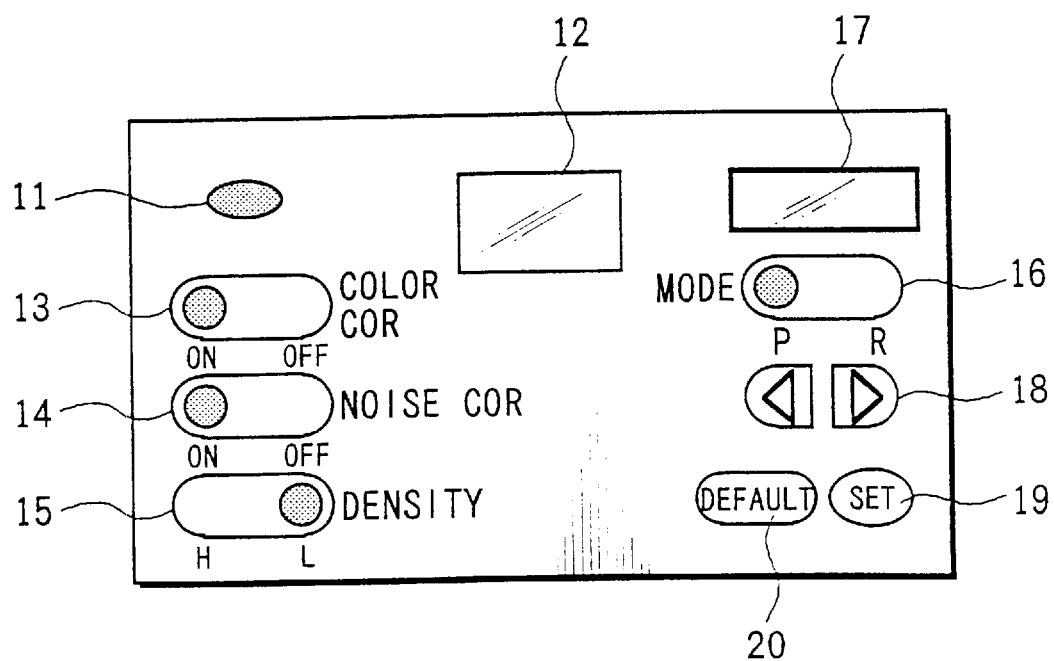
FIG. 2 is a rear view of the electronic camera.

An electronic camera provided with a color discriminating apparatus embodying the invention is described. FIG. 1 is a perspective view showing an external configuration of an electronic camera 1 provided with a color discriminating apparatus embodying the invention, and FIG. 2 is a rear view of the electronic camera 1.

In these FIGURES, the electronic camera 1 is provided with a taking lens 2 comprised of a zoom lens substantially in the middle of its front surface. Above the taking lens 2 are arranged a light projecting window 4 and a light receiving window 5 for measuring a distance to an object according to an active metering method, and a light measuring window 3 for measuring a luminance of the object is arranged between the windows 4 and 5. Further, an objective window 6 of a viewfinder is arranged at the left side of the light projecting window 4.

Infrared rays are projected to the object through the light projecting window 4, and the infrared rays reflected by the object are received through the light receiving window 5. Although the active metering method is adopted in this embodiment, a passive metering method may be adopted.

In one side surface of the electronic camera 1 is provided a card insertion slot 7 for loading and ejecting a hard disk card 10 (hereinafter, "HD card 10"). A card eject button 8 for ejecting the HD card 10 is provided above the card insertion slot 7. Further, a shutter button 9 is provided on a left end portion of the upper surface of the electronic camera 1.

In the case that a photographed content is to be printed out, the HD card 10 is ejected from the electronic camera 1 by pushing the card eject button 8 and is mounted in a printer compatible with the HD card 10 to print the photographed content out.

Alternatively, the electronic camera 1 may be provided with an interface of an SCSI cable and be connected with a printer via the SCSI cable, so that a photographed image can be printed by directly transferring an image data from the electronic camera 1 to the printer.

Although the hard disk card of the PCMCIA standards is used as a storage medium for the image data in this embodiment, a memory card, a mini-disk (MD) or other storage medium may be used provided it can store a photographed content as an image data.

On the rear surface of the electronic camera 1 are provided, as shown in FIG. 2, a main switch 11 for activating the electronic camera 1 at an upper left end and an eyepiece window 12 of the viewfinder substantially in the middle. Below the main switch 1 are provided a color correction switch 13, a noise correction switch 14 and a density setting switch 15.

Further, a mode changeover switch 16, a color registration confirmation indicator 17, color selection buttons 18, a set bottom 19 and a default button 20 are provided at a right end of the rear surface of the electronic camera 1.

In the case that characters, graphs and the like drawn on a white board are directly photographed to be used as a recording material, a photographed image is not required to have a highly descriptive quality as in a normal picture, but is required to have a highly informative quality such as clear characters, etc. The color correction switch 13 is adapted to increase the density of characters and diagrams of the photographed image in order to make them clear and to instruct a specified image processing to clearly separate colors.

Generally, characters, graphs, etc. are drawn on a white board by color pens of several colors such as red, blue, green, orange and black and an informativeness (easy to see and easy to distinguish, etc.) of the characters and the like of the photographed image is more important than the reproducibility of colors in the image obtained by photographing the characters, graphs, etc. Accordingly, in this image processing, it is discriminated in which colors the characters and the like in the photographed image are, and a processing for allotting a specified color which is set in advance so as to correspond to the discrimination result to the characters (a processing for replacing an image data in an area constituting the characters by an image data of a preset color) is performed.

The above image processing is applied to the photographed image if the color correction switch 13 is on, whereas an image processing corresponding to the normal photographing is applied to the photographed image without applying the above image processing if the color correction switch 13 is off. Accordingly, if a photographing mode for the normal photographing and a photographing mode for photographing the characters and the like drawn on the white board for a recording purpose are referred to as "normal mode" and "document mode", the color correction switch 13 is a switch for switchingly setting the normal mode and the document mode.

The noise correction switch 14 is adapted to correct pseudo colors produced as noises in the characters or the like of the photographed image during the image processing in the document mode. When the noise correction switch 14 is turned on, a processing for correcting the pseudo colors produced in the characters or the like of the photographed image as described later is performed. Such a processing is not performed if the noise correction switch 14 is turned off. Since the noise correction switch 14 functions in the document mode, an instruction for the pseudo color correction is ignored even if the noise correction switch 14 is turned on while the color correction switch 13 is off.

The density setting switch 15 is adapted to set a density information of an object to make thin-line and low density characters or graphs of an image clear during the image processing in the document mode. The density information set by the density setting switch 15 is used to switch a discrimination threshold value in the color discrimination of the image processing in the document mode according to the density of the object. In this embodiment, the density information is switched between "high" and "low" by the density setting switch 15. Since the density setting switch 15 also functions in the document mode, an instruction for the density correction is ignored even if the density setting switch 15 is turned on while the color correction switch 13 is off. It should be noted that the density can continuously be set.

The mode changeover switch 16 is adapted to switchingly set the photographing mode for performing photographing and a color registration mode for registering colors for the color discrimination. In the color registration mode, image data of colors used in the aforementioned color discrimination and color replacement are set and registered by actually photographing color samples (color patches or the like produced on the white board by color pens). Default values of the color data are set in advance in the electronic camera 1, and are used for the color discrimination and color data replacement unless an operator registers color data in the color registration mode.

Figure 3:
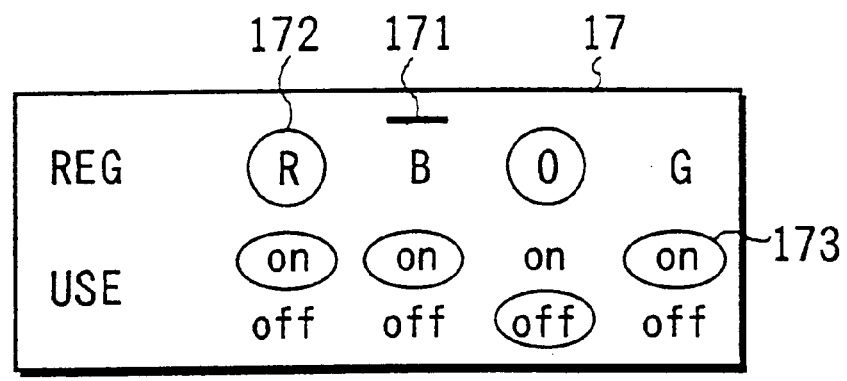
FIG. 3 is a diagram showing an exemplary display of a color registration confirmation indicator.

In this embodiment, four colors: red, blue, orange and green can be registered as shown in FIG. 3. Accordingly, if the mode changeover switch 16 is set in the "color registration", desired color data can be registered by photographing color samples of red, blue, orange and green. On the other hand, if the mode changeover switch 16 is set in the "photographing", photographing can be performed.

The color registration confirmation indicator 17 is adapted to display contents of the color registration and colors used during the color data replacement. The indicator 17 is used to select colors to be registered in the color registration mode while being used to select colors to be used during the color data replacement in the photographing mode. In FIG. 3, the displays of "red", "blue", "orange" and "green" are kinds of colors which can be registered. Although four colors can be registered in this embodiment, 5 or more colors may be registered or other four colors (such as yellow and brown) may be registered.

A bar indicator 171 in an upper part of the indicator 17 indicates a color selected for the color registration or color use. In FIG. 3, "blue" is selected. The bar indicator 171 moves to the left and right by operating the color selection button 18, so that the operator can selected a desired color by operating the color selection button 18 in the color registration mode. The bar indicator 171 moves to the right: "red→blue→orange→green→red" every time the right color selection button 18 is pressed while moving to the left "green←red←blue←orange←green" every time the left color selection button 18 is pressed.

Figure 4:
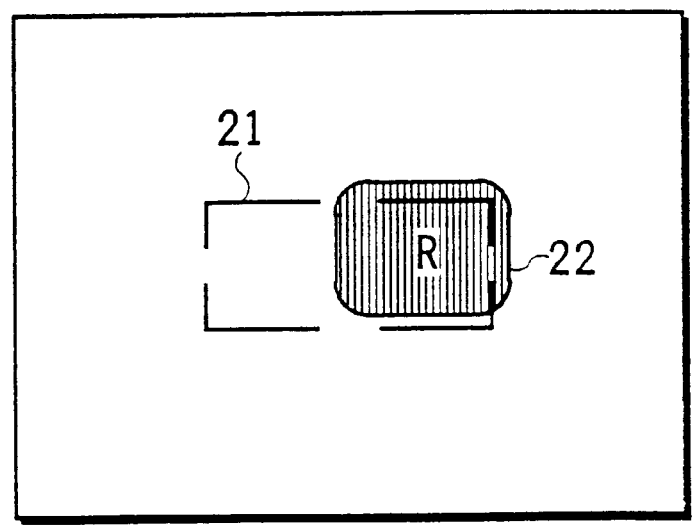
FIG. 4 is a diagram showing a frame representing a color data sensing area displayed within a viewfinder in a color registration mode.

Colors enclosed by circle indicators 171 in the color registration row are registered, and those not enclosed thereby are not registered. The color registration is performed by, after setting the color registration mode and selecting a desired color, e.g., "red" by the bar indicator 171, photographing a color sample produced by, e.g., painting a portion of a suitable size on the white board by a red pen. In this case, a frame 21 representing a color data range is displayed in the center of the viewfinder as shown in FIG. 4, and the color data can be registered by photographing a color sample 22 while adjusting the frame 21 so that the color sample 22 covers a predetermined area or larger of the frame 21. During the photographing in the color registration mode, color component data of R, G, B constituting the color (red in the example of FIG. 4) and second power normalized data (to be described later) generated using these data are registered using the image data of the photographed image within the frame 21 (stored in the memory).

A color use row indicates whether or not the registered colors or default colors are used in the color discrimination and the color data replacement in the color correction mode. Colors having "ON" enclosed by circle indicators 173 are to be used, and those having "OFF" enclosed thereby are not to be used. In the display example of FIG. 3, three color except orange are used in the color data replacement.

The colors are set on and off in the color use row by operating the set button 20 after selecting the colors by the color selection button 18 in the color registration mode. The positions of the circle indicators 173 in the color use row are alternately switched to ON and OFF every time the set button 20 is pressed. The operator can set the colors to be used or not to be used by operating the set button 20 while viewing the display positions of the circle indicators 173.

The default button 20 is an operation button for returning the registered color to a default color. In the color registration mode, the display of the circle indicator 172 disappears, canceling the color registration if the default button 20 is pressed after the desired color is set by the bar display 171.

Figure 5:
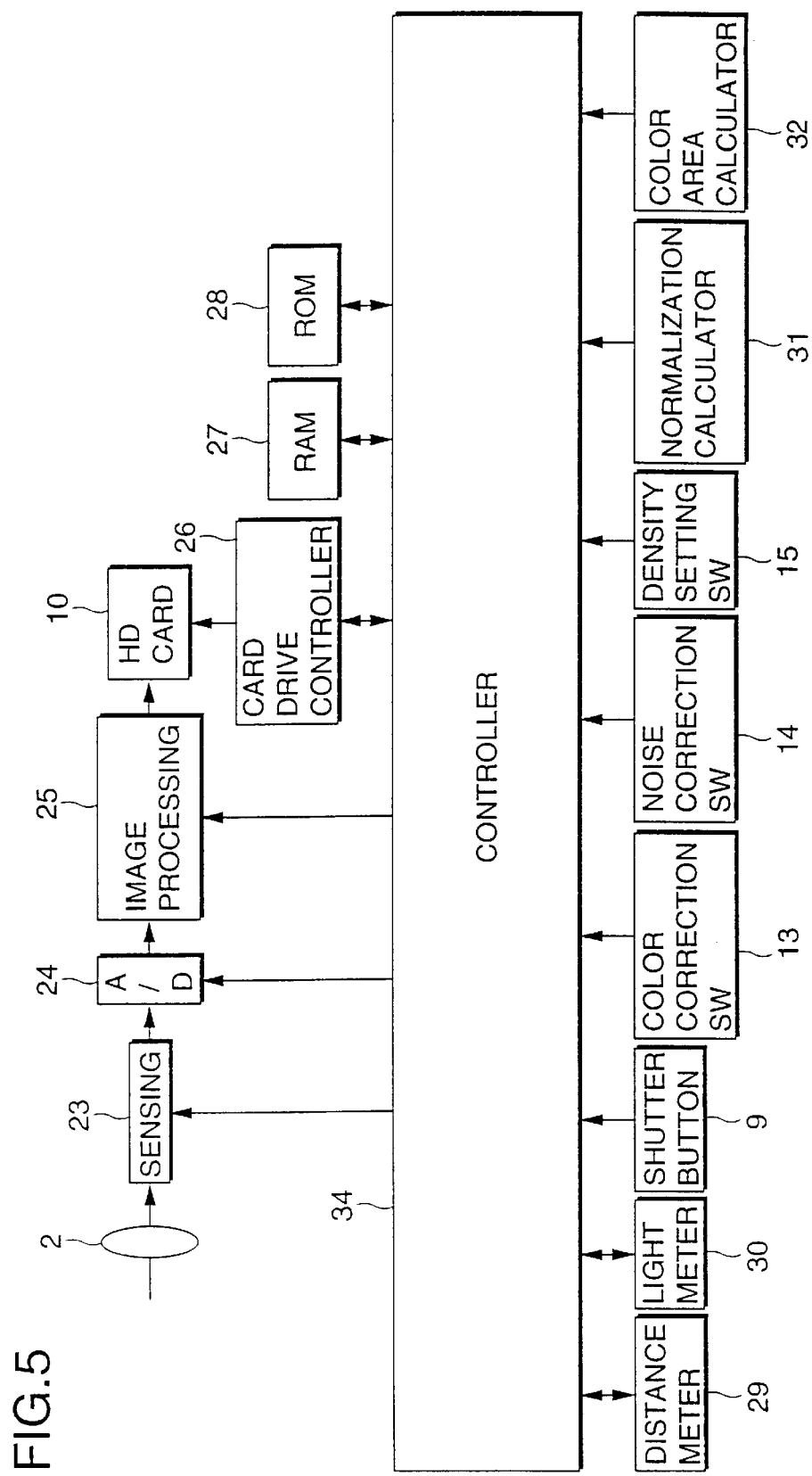
FIG. 5 is a block diagram showing a construction of an image processing assembly for a sensed image in a document mode of the electronic camera.

FIG. 5 is a block construction diagram of an assembly for processing the photographed image in the document mode of the electronic camera embodying the invention.

In FIG. 5, the same elements as those shown in FIGS. 1 and 2 are identified by the same reference numerals. An image sensing unit 23 converts an object light image focused on a sensing surface of an image sensor into an image signal and outputs the same. The image sensing unit 23 includes the image sensor such as a CCD color area sensor, a CCD drive control circuit for controlling the drive of the image sensor (hereinafter, "CCD") and an analog signal processing circuit for applying specified signal processings including a noise reduction and a level adjustment to the image signal (analog signal) outputted from the CCD.

The CCD color area sensor outputs the object light image while separating it into image data of color components R, G, B, and may be a single-plate area sensor or a three-plate area sensor. In the image sensing unit 23, the sensing operation of the CCD (electric charge storing and readout of the stored electric charge) is controlled in accordance with an exposure control value (shutter speed) sent from a controller 34 for centrally controlling the photographing operation of the camera. In other words, the exposure (electric charge storing) of the CCD is started in accordance with an exposure start signal from the controller 34, and the stored electric charges are read from the CCD for each color component upon the completion of the exposure after the elapse of a predetermined time. After the specified signal processings are applied to the read electric charges in the analog signal processing circuit, they are transferred to an image processing unit 25 via an A/D converter 24.

The A/D converter 24 converts the analog image signal read from the image sensing unit 23 into a digital image signal (hereinafter, "image data") of, e.g., 8 bits.

The image processing unit 25 applies a white balance adjustment, a γ-correction, a shading correction and other specified image processings to the image data sent from the A/D converter 24 in the normal mode, whereas it applies a background filtering, a color correction, a black area correction, a color data replacement and other specified image processings to the image data in the document mode. The image processing unit 25 outputs the processed image data to the HD card 10 after applying a specified compression.

The HD card 10 is a storage medium for storing the image data representing the photographed image, and the card drive controller 26 controls the drive of the HD card 10.

The RAM (random access memory) 27 is a memory the controller 24 uses for the photographing, color registration and other functions. The ROM (read only memory) 28 is a memory for storing data and a processing program necessary to control the image sensing operation and for storing data and a processing program necessary to perform a variety of processings including the background filtering, color discrimination, black area correction and pseudo color erasure in the document mode to be described later.

The distance meter 29 is provided behind the light projecting window 4 and light receiving window 5 to detect an object distance. The light meter 30 includes a photodetector such as a SPC provided behind the light metering window 3 to detect an object luminance.

A set color normalization calculator 31 calculates normalized data to be described later using the image data of the color samples inputted in the color registration mode. Assuming that Xr, Xg, Xb denote levels of the image data of the respective color components R, G, B and xr, xg, xb denote the normalized data, the normalized data are calculated by $xr=Xr^2/(Xr^2+Xg^2+Xb^2)$, $xg=Xg^2/(Xr^2+Xg^2+Xb^2)$ and $xb=Xb^2/(Xr^2+Xg^2+Xb^2)$, and are used for the color area division when the color discrimination is performed based on the coordinates of the normalized data in an xb–xg plane. A color discrimination method based on the coordinates of the normalized data is described in detail later.

The set color normalization calculator 31 extracts image data within the frame 21 in the view screen from the image data of the color samples inputted in the color registration mode and further extracts image data below a predetermined level from the extracted data. The latter extraction is adapted to extract the image data corresponding to a red sample within the frame 21 in FIG. 4. The normalization calculator 31 calculates second power normalized data using the extracted image data of the color sample. The calculation result is stored in the RAM 27 via the controller 34.

A color area calculator 32 divides the xb–xg plane into color areas used for the color discrimination based on the coordinates of the normalized data in the xb–xg plane. Specifically, in the case that a chromatic color is discriminated with respect to blue, green, orange and red, the xb–xg plane is divided into four color areas of blue, green, orange and red in the color discrimination based on the coordinates of the normalized data. The color discrimination is performed based on in which color area the coordinates of the normalized data are located. The color area calculator 32 calculates boundary lines for dividing the xb–xg plane into four color areas of blue, green, orange and red. The calculation result of the boundary lines are also stored in the RAM 27. The setting of the color areas is described later.

The controller 34 centrally controls the image sensing operation of the electronic camera 1 and is comprised of a microcomputer. The controller 34 controls the drive of the image sensing unit 23 to sense an object image, controls the drive of the image processing unit 25 to apply specified image processings to the sensed image, and controls the drive of the card drive controller 26 to store the processed image data in the HD card 10.

Figure 6:
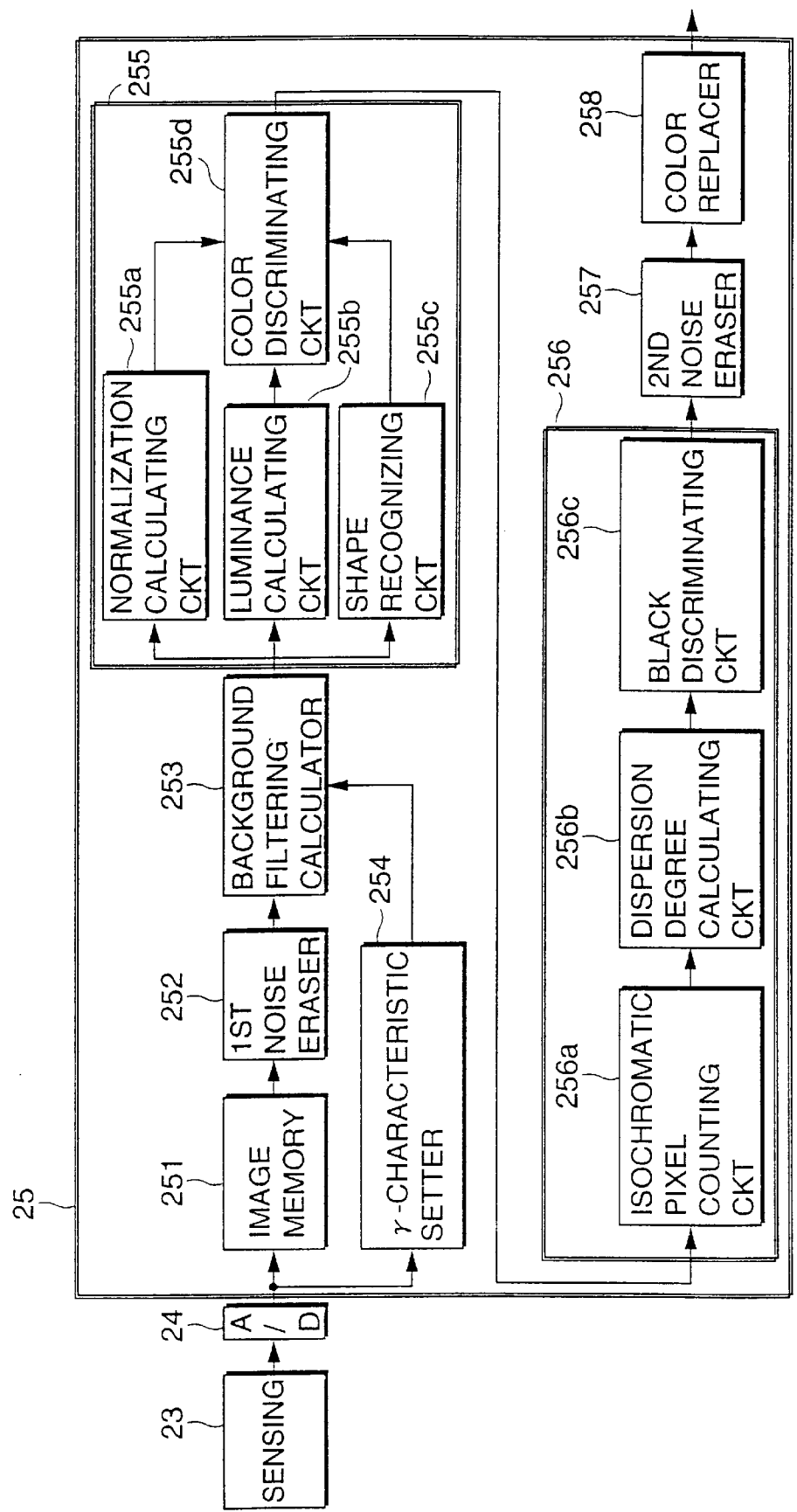
FIG. 6 is a block diagram showing a construction of an image processing unit in the document mode.

FIG. 6 is a block diagram for the image processing (color correction) of the image processing unit in the document mode.

The image processing unit 25 includes an image memory 251, a first noise eraser 252, a background filtering calculator 253, a γ-characteristic setter 254, a color discriminating device 255, a black area correcting device 256, a second noise eraser 257 and a color replacer 258 as a circuit block for performing a color correction in the document mode.

Figure 7:
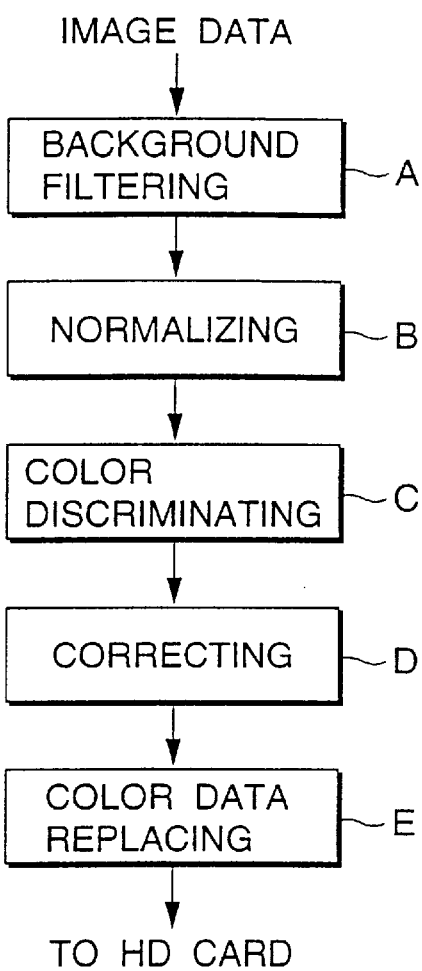
FIG. 7 is a flowchart schematically showing a procedure of image processing in the document mode.

In the document mode, as shown in FIG. 7, after a preprocessing (processing A) for filtering a background image into a white image is applied to the image data inputted in the image processing unit 25, the normalized data are generated by adding the second powers of the image data (image data of R, G, B) in the respective pixel positions (processing B) and the color discrimination is performed using the normalized data (processing C). After those of the image data representing the characters and the like which have mistakenly been color-discriminated are corrected and those of the image data in the black area which have been colored in chromatic colors are corrected (processing D), the image data in the respective pixel positions are outputted to the HD card 10 after being replaced by specific color data based on the color discrimination result (processing E).

The image memory 251 is adapted to temporarily store the image data of the respective color components R, G, B inputted from the A/D converter 24. The first noise eraser 252 reduces the noise of the image data inputted to the image memory 251 by, for example, replacing the image data in each pixel position by an average value of 8 image data in neighboring pixel positions.

Figure 8:
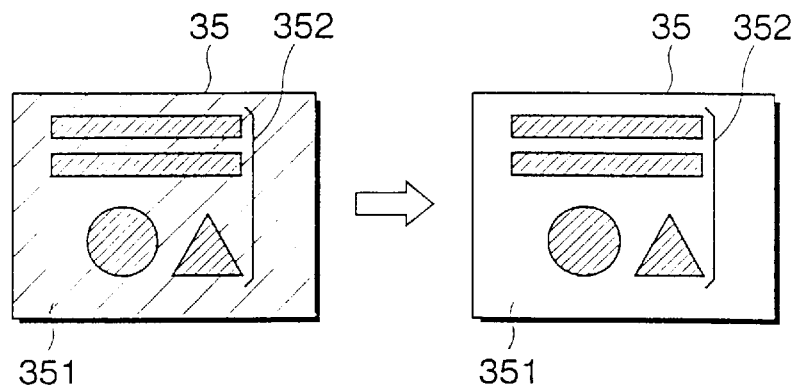
FIG. 8 is a diagram showing a background filtering.

The background filtering calculator 253 separates a background portion and a character portion of the image data, and converts an area corresponding to the background portion into a specified white level data. Specifically, in the case of an image, e.g., obtained by photographing an object in which characters and graphics are drawn on a white board (hereinafter, "white board photographed image"), an image representing a board portion 351 of a white board 35 is made uniformly white as shown in FIG. 8 in order to make the image of the character portion 352 easily visible. The background filtering calculator 253 converts the background portion into a white image by applying the γ-correction to the image data in the respective pixel positions in accordance with a γ-characteristic inputted from the γ-characteristic setter 254.

Figure 9:
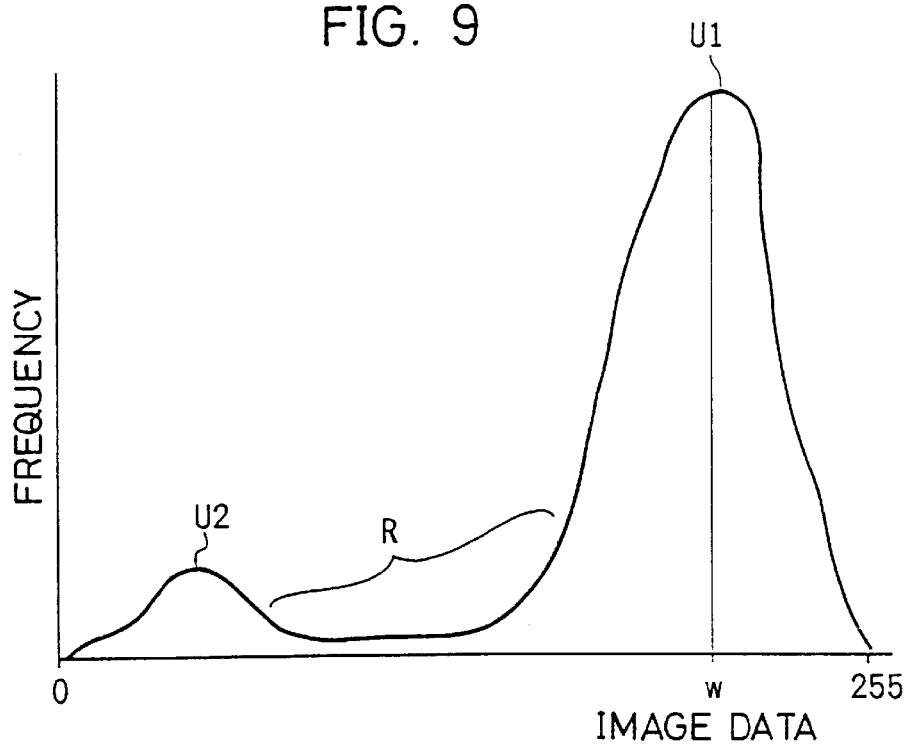
FIG. 9 is a graph showing a typical frequency distribution curve of an image data representing an image obtained by photographing a white board.

The γ-characteristic setter 254 sets the γ-characteristic for the background filtering. The circuit 254 generates a frequency distribution curve of the input image data and determines the γ-characteristic based on this frequency distribution curve. FIG. 9 is a typical frequency distribution curve of the white board photographed image. With a character image, two large and small convex portions U1, U2 are generally seen. The large convex portion U1 seen in a bright region corresponds to the board portion 351, whereas the small convex portion U2 seen in a dark region corresponds to clear characters and graphics of the character portion 352. A valley R between the large and small convex portions U1, U2 corresponds to a smear of the board portion 351 and light-color or thin-line characters and graphics of the character portion 352.

Figure 10:
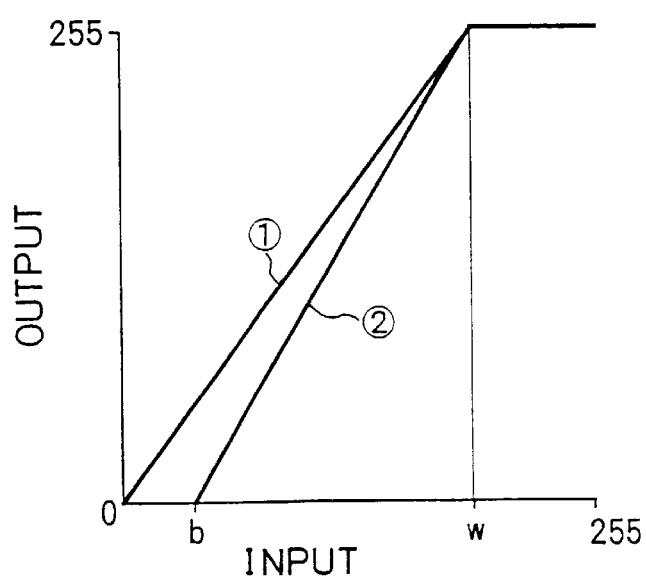
FIG. 10 is a graph showing exemplary γ-characteristics set for the background filtering.

The γ-characteristic setter 254 calculates, for example, a level w of the image data corresponding to a peak of the large convex portion U1 and determines a γ-characteristic ① having this level W as a white saturation level as shown in FIG. 10. It should be noted that FIG. 10 shows a γ-characteristic in the case that the image data is a 8-bit data, wherein a level "255", is a white level and a level "0" is a black level. According to the γ-characteristic ① shown in FIG. 10, the image data equal to or above the level w are all converted into the white level and those below the level w have their level linearly converted at a specified conversion ratio (γ-value) according to their levels. In order to intensify the black of the character portion 352, a γ-characteristic ② having a specified low level b as a black saturation level may be used. According to the γ-characteristic ②, the image data equal to or below the level b are all converted into the black level.

Accordingly, if the background filtering calculator 253 applies the γ-correction to the image data using the γ-characteristic ① (or ②) set by the γ-characteristic setter 254, the image data of the board portion 351 are substantially uniformly converted into white data as shown in FIG. 8, with the result that the background image of the photographed image is made white.

The color discriminating device 255 discriminates colors in the respective pixel positions and includes a normalization calculating circuit 255a for performing the color discrimination, a luminance calculating circuit 255b, a shape recognizing circuit 255c and a color discriminating circuit 255d.

In this embodiment, the color discrimination is performed based on the positions of the normalized data of two color components. However, unlike the conventional method where the color discrimination is performed using first power normalized data $xr=Xr/(Xr+Xg+Xb)$, $xg=Xg/(Xr+Xg+Xb)$ and $xb=Xb/(Xr+Xg+Xb)$, i.e., representing mixing ratios of the respective color components R, G, B in the image data, the second power normalized data $xi=Xi^2/(Xr^2+Xg^2+Xb^2)$ (i=r, g, b) are used in this embodiment.

The reason why the second power normalized data are used in this embodiment is that color classification to make the characters and the like easily visible is important for the photographing in the document mode and, accordingly, the use of the second power normalized data is more advantageous for the color discrimination as described below.

Figure 11:
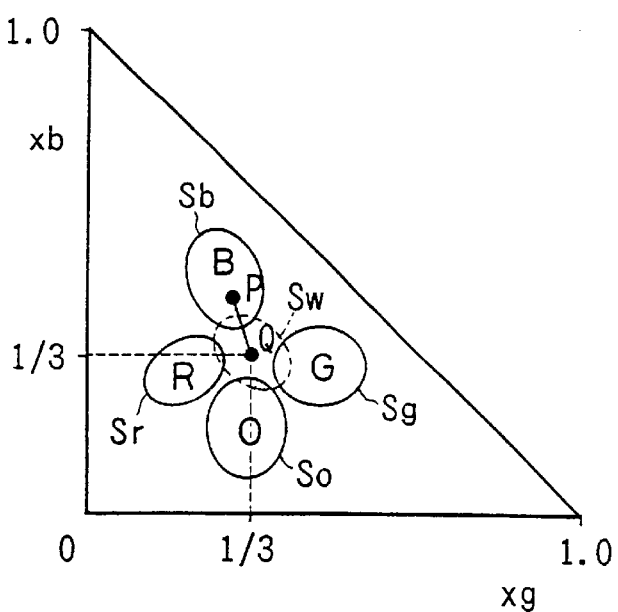
FIG. 11 is a chart showing a color distribution of blue, green, orange and red in a xb–xg plane in the case of the color discrimination using first power normalized data xb, xg.
Figure 12:
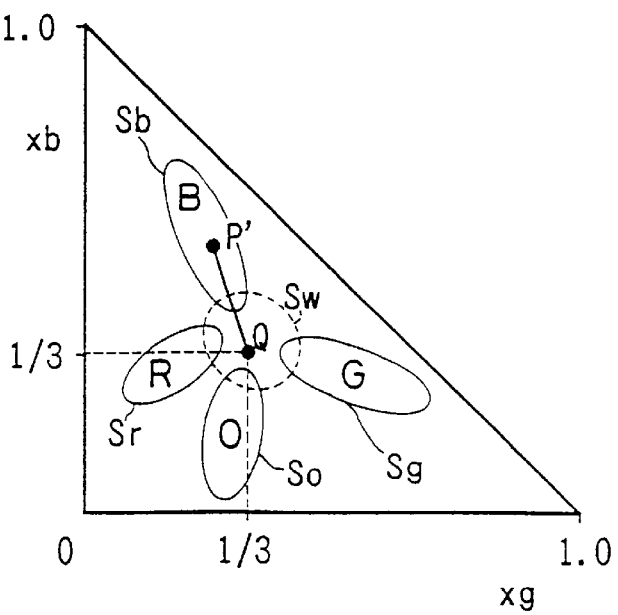
FIG. 12 is a chart showing a color distribution of blue, green, orange and red in the xb–xg plane in the case of the color discrimination using second power normalized data xb, xg.

FIG. 11 is a chart showing the color distribution of blue, green, orange and red in the xb–xg plane in the case that the color discrimination is performed using the first power normalized data xb, xg, and FIG. 12 is a chart showing the color distribution of blue, green, orange and red in the xb–xg plane in the case that the color discrimination is performed using the second power normalized data xb, xg.

In FIGS. 11 and 12, point Q ((xb, xg)=(1/3, 1/3)) is a position discriminated to be completely achromatic if being photographed by a camera having an ideal white balance, and points ((xb, xg)=(1, 0), (0, 1), (0, 0)) are positions discriminated to be perfectly blue, green and red. Since an actual camera does not have an ideal white balance, even if a purely blue image is photographed, the normalized data (xb, xg) of the photographed image is not (1, 0), but is rather generally located within an area skewed toward the point Q.

For example, the normalized data (xb, xg) of the respective colors obtained by, e.g., photographing color samples produced on the white board by four standard color pens of blue, green, orange and red are distributed within areas encircled by ellipses Sb, Sg, So, Sr. Further, an achromatic color, i.e., white or black is distributed within an area Sw near the point Q.

As is clear from the comparison of the ellipses Sb, Sg, So, Sr of FIGS. 11 and 12, the ellipses Sb, Sg, So, Sr are flatter when the second power normalized data (xb, xg) are used, and the position of the normalized data (xb, xg) generated from the image data of the same chromatic color is more distant from the ideal achromatic color point Q (compare points P, P' plotted in the blue areas of FIGS. 11 and 12). Accordingly, the color discrimination can more easily and accurately be performed by using the second power normalized data than by using the first power normalized power.

The normalization calculating circuit 255a converts the image data of the respective color components R, G, B in the respective pixel positions into the second power normalized data $xr=Xr^2/(Xr^2+Xg^2+Xb^2)$, $xg=Xg^2/(Xr^2+Xg^2+Xb^2)$ and $xb=Xb^2/(Xr^2+Xg^2+Xb^2)$.

Figure 13:
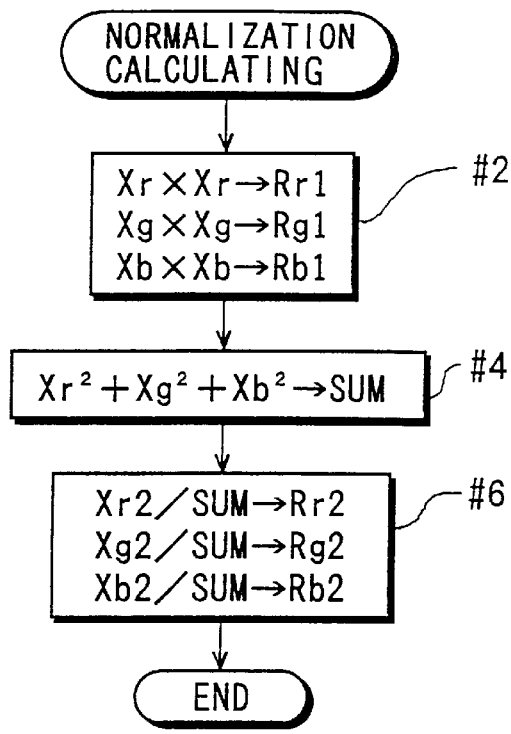
FIG. 13 is a flowchart of a normalization for converting image data Xr, Xg, Xb into second power normalized data xr, xg, xb.

The normalization calculating circuit 255a converts the image data Xr, Xg, Xb in the respective pixel positions into the second power normalized data xr, xg, xb in accordance with a flowchart of FIG. 13.

Specifically, the image data Xr, Xg, Xb of the respective color components are squared and the calculation results are stored in registers Rr1, Rg1, Rb1 (Step #2). Subsequently, the squares $Xr^2$, $Xg^2$, $Xb^2$ of the image data Xr, Xg, Xb stored in the registers Rr1, Rg1, Rb1 are added and the calculation result is stored in a register SUM (Step #4). The squares $Xr^2$, $Xg^2$, $Xb^2$ stored in the registers Rr1, Rg1, Rb1 are divided by the sum $(Xr^2+Xg^2+Xb^2)$ stored in the register SUM, and the calculation results are stored in registers Rr2, Rg2, Rb2. In this way, the calculation processing of the circuit 255a is completed (Step #6).

If normalized data (xb, xg) of higher than second power are used, a tendency of the position of the normalized data (xb, xg) in the xb–xg plane to move away from the achromatic color point Q becomes stronger and, accordingly, a characteristic of tint of the image data (i.e., toward which of blue, green, orange or red it is skewed) becomes more clear. Thus, k-th power (k>2) normalized data calculated by:

$$xr=Xr^k/(Xr^k+Xg^k+Xb^k)$$

$$xg=Xg^k/(Xr^k+Xg^k+Xb^k)$$

$$xb=Xb^k/(Xr^k+Xg^k+Xb^k)$$

may be used.

In this embodiment, the image data of color components R, G, B are described. However, even in the case that image data of other color components X(1), X(2), . . . X(n) are used, normalized data of second or higher power $x(1)^k=X(1)^k/\Sigma X(i)^k$, $x(2)^k=X(2)^k/\Sigma x(i)^k$, . . . $x(n)^k=X(n)^k/\Sigma X(i)^k$ can be used.

The color discrimination needs to discriminate chromatic colors against each other as well as to discriminate chromatic colors against achromatic colors, i.e., white and black. The chromatic-or-achromatic color discrimination can be performed by detecting the positions of the normalized data in the xg–xb plane.

However, since only differences between the color components R, G, B of the image are extracted and a dark/bright information is abstracted in the normalized data generated from the image data of color components R, G, B, black having a low luminance and white having a high luminance may mistakenly be discriminated to a chromatic color such as red or blue if the color discrimination is performed using only the normalized data. For example, the second power normalized data (xb, xg) corresponding to a black pixel position where the image data (Xr, Xg, Xb) of the color components R, G, B is (20, 5, 5) is (0.06, 0.06), which is same as the second power normalized data (xb, xg) corresponding to a red pixel position where the image data (Xr, Xg, Xb) of the color components R, G, B is (200, 50, 50). Therefore, black may be mistakenly discriminated to be red.

In order to avoid such an error discrimination, the color discrimination (including achromatic color discrimination) is performed using the luminance information in the respective pixel positions and the aforementioned normalized data in this embodiment. In addition, in order to reduce the influence of the line width on the color discrimination, the color discrimination is performed in consideration of geometric shapes such as characters and graphics as described later.

The luminance calculating circuit 255$b$ calculates the luminance information in the respective pixel positions used for the color discrimination. This circuit 255$b$ calculates, for example, an average value Y (=(Xr+Xg+Xb)/3) of the image data Xr, Xg, Xb of the color components R, G, B as luminance information in each pixel position used for the color discrimination.

Figure 14:
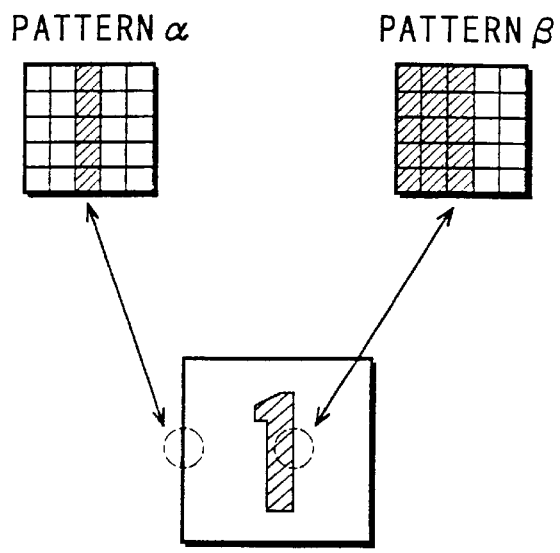
FIG. 14 is a diagram showing a method for detecting a thin line portion and a thick line portion by a pattern matching.

The shape recognizing circuit 255$c$ recognizes whether an area constituting a character or graphic is a linear or a surface. This circuit 255$c$ corrects the level of the image data within each block of 5×5 pixels or 7×7 pixels so as to reach its maximum at "255" and then detect a thin-line portion pattern $\alpha$ and a thick-line portion pattern $\beta$ as shown in FIG. 14 by pattern matching by a square error calculation with a template having image data of "0" and "255" levels or the image data of a several levels between "0" and "255". The detection result is inputted to the color discriminating circuit 255$d$. Instead of pattern matching, the shape may be discriminated by a high frequency component detection.

The color discriminating circuit 255$d$ discriminates the color (e.g., white, black, blue, green, orange or red) in each pixel position based on the normalized data (xb, xg) calculated by the normalization calculating circuit 255$a$, the luminance information calculated by the luminance calculating circuit 255$b$ and the pattern result recognized by the shape recognizing circuit 255$c$ using specified threshold profiles shown in FIGS. 15 to 18.

Figure 15:
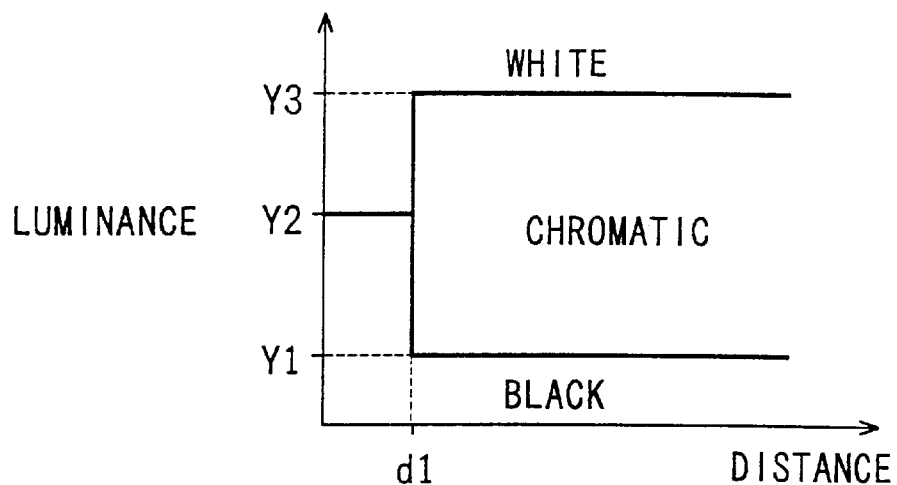
FIG. 15 is a graph showing a first threshold profile for the chromatic-or-achromatic color discrimination based on a luminance information therefor.
Figure 16:
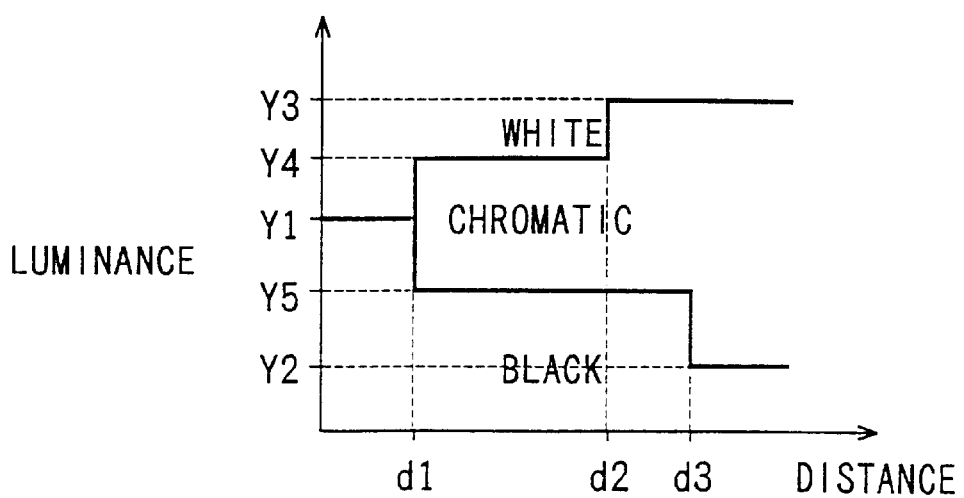
FIG. 16 is a graph showing a second threshold profile for the chromatic-or-achromatic color discrimination based on the luminance information therefor.
Figure 17:
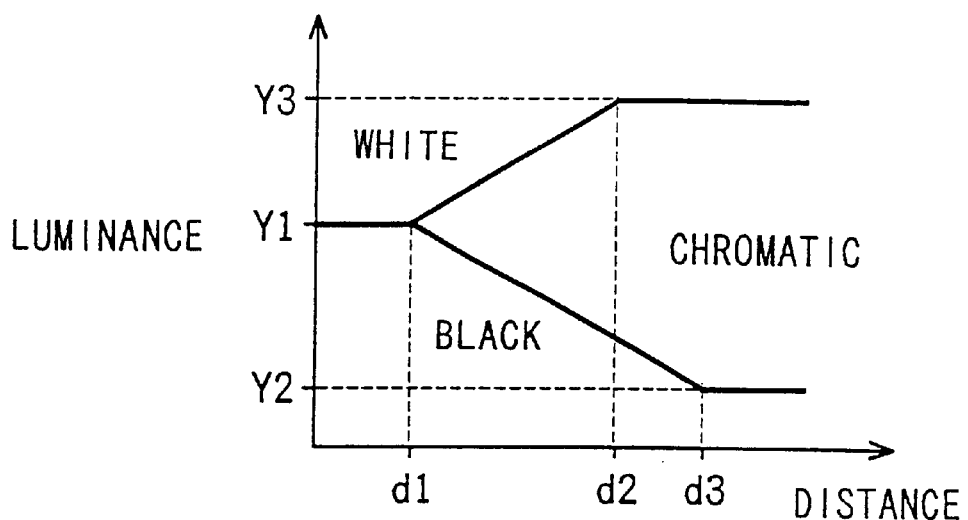
FIG. 17 is a graph showing a third threshold profile for the chromatic-or-achromatic color discrimination based on the luminance information therefor.
Figure 18:
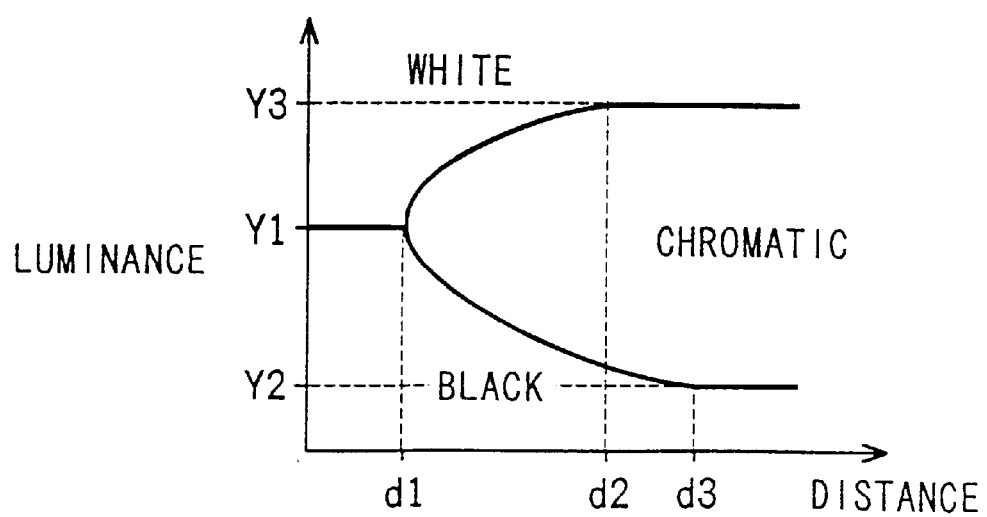
FIG. 18 is a graph showing a fourth threshold profile for the chromatic-or-achromatic color discrimination based on the luminance information therefor.

FIG. 15 is a chart showing a first threshold profile for the chromatic-or-achromatic color discrimination based on the luminance information therefor. FIGS. 16 to 18 are chart showing second to fourth threshold profiles for the chromatic-or-achromatic color discrimination based on the luminance information therefor, respectively.

In FIGS. 15 to 18, a horizontal axis represents distance information (or color information) from the achromatic color point Q in the xb–xg plane, and a vertical axis represents a luminance level for the color discrimination.

The distance information does not represent an actual distance between the point Q and the position of the normalized data (xb, xg) in the xb–xg plane, but specifies an equidistant line (a closed curve including the achromatic color point Q (1/3, 1/3)) obtained by projecting a closed surface equidistant from an achromatic color point (1/3, 1/3, 1/3) in an xr–xg–xb space onto the xb–xg plane.

Here, the distance information is briefly described. In the case that arbitrary normalized data (xb, xg) on the equidistant line in the xb–xg plane are treated as a group of equidistant data, an actual distance between the point Q and the position of the normalized data (xb. Xg) in the xb–xg plane can be used as the distance information if the equidistant line is a circle having its center at the achromatic color point Q (1/3, 1/3).

However, the equidistant line is the projection of the closed surface equidistant from the achromatic color point (1/3, 1/3, 1/3) in the xr–xg–xb space as described above, and is a non-circular closed curve having its center at the achromatic color point (1/3, 1/3). Accordingly, the actual distance between the point Q and the position of the normalized data (xb, xg) cannot be used as the distance information.

The normalized data (xb, xg) and the equidistant line to which the normalized data (xb, xg) belong are in a one-to-one correspondence. Accordingly, in order to give the same distance information to the normalized data (xb, xg) on the equidistant line, a distance information for defining the position of the equidistant line in the xb–xg plane is used as the distance information of the normalized data (xb, xg) on the equidistant line in this embodiment.

In order to determine the distance information for a given normalized data (xb, xg), the equidistant line to which this normalized data (xb, xg) belongs needs to be determined. However, an equidistant line to which the normalized data (xb, xg) on a plurality of equidistant lines obtained by projecting a plurality of equidistant surfaces concentrically formed about the achromatic color point (1/3, 1/3, 1/3) in the xr–xg–xb space belong needs not necessarily be determined for the following reason. Since the distance information of the normalized data (xb, xg) is used for the color discrimination by the relative comparison with a specified threshold value, it is sufficient to specify the position of the normalized data (xb, xg) from the achromatic color point Q (1/3, 1/3) by a relative distance information.

If a relative distance information is determined for the given normalized data (xb, xg) based on the equidistant line, the equidistant line used may be a closed curve having a specified shape which is determined by the given normalized data (xb, xg) and a plurality of normalized data (xb, xg) on an other equidistant line.

On the other hand, 6 normalized data (xr, xb, xg), (xb, xg, xr), . . . in which the components are interchanged are equidistant from the achromatic color point (1/3, 1/3, 1/3) in the xr–xb–xg space, and points of these normalized data projected onto the xb–xg plane plot an equidistant line in the xb–xg plane. Therefore, the shape of the usable equidistant line must be formed at least by the given normalized data (xb, xg) and other five normalized data (xr, xb), (xr, xg), (xb, xr), (xg, xr), (xg, xb) generated by interchanging the components of the normalized data.

Accordingly, in the xb–xg plane, an arbitrary shape including 6 normalized data (xb, xg), (xr, xb), (xr, xg), (xb, xr), (xg, xr), (xg, xb) generated by interchanging three components can be a specific shape of the equidistant line.

Figure 19:
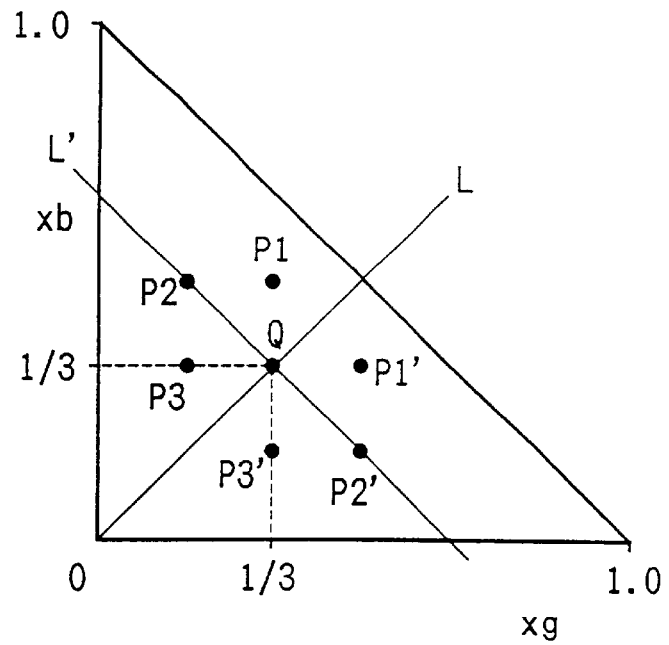
FIG. 19 is a chart showing an exemplary positional relationship of 6 normalized data having their components interchanged in the xb–xg plane.

FIG. 19 is a graph showing an exemplary positional relationship of the 6 normalized data including interchanged components in the xb–xg plane.

Points P1 (1/2, 1/3), P2 (1/2, 1/6), P3 (1/3, 1/6), P1' (1/3, 1/2), P2' (1/6, 1/2), P3' (1/6, 1/3) shown in FIG. 19 are plotted points of the 6 normalized data which are different combinations of the components xr (=1/6), xg (=1/2), xb (=1/3) in the xb–xg plane. As is clear from FIG. 19, the points P1', P2', P3' are symmetric with respect to a straight line L connecting the points P1, P2, P3 (straight line connecting an origin and the point Q). Further, the points P3, P3' are symmetric with respect to a straight line L' connecting the points P1, P1' (a straight line normal to the straight line L passing the origin). Such symmetries of the points P1 to P3, P1' to P3' result from the fact that the normalized data at the respect points are determined by interchanging the components satisfying a relationship:

$$xr+xb+xg=1.$$

Accordingly, the equidistant line to which the point P1 belongs passes the points P1 to P3, P1' to P3' and must have a shape symmetric with the straight lines L, L'. For example, an ellipse C1 shown in FIG. 20, an isosceles triangle C2 shown in FIG. 21 or a hexagon C3 shown in FIG. 22 is considered as such a shape.

When the shape of the equidistant line is specified, the equidistant line of this specific shape to which the given normalized data (xb, xg) belongs is calculated from the normalized data (xb, xg) if a method for calculating a distance to the equidistant line from the achromatic color point Q (1/3, 1/3) is determined. The distance information for the given normalized data (xb, xg) can be determined by calculating the distance between the equidistant line and the achromatic color point Q (1/3, 1/3).

Figure 20:
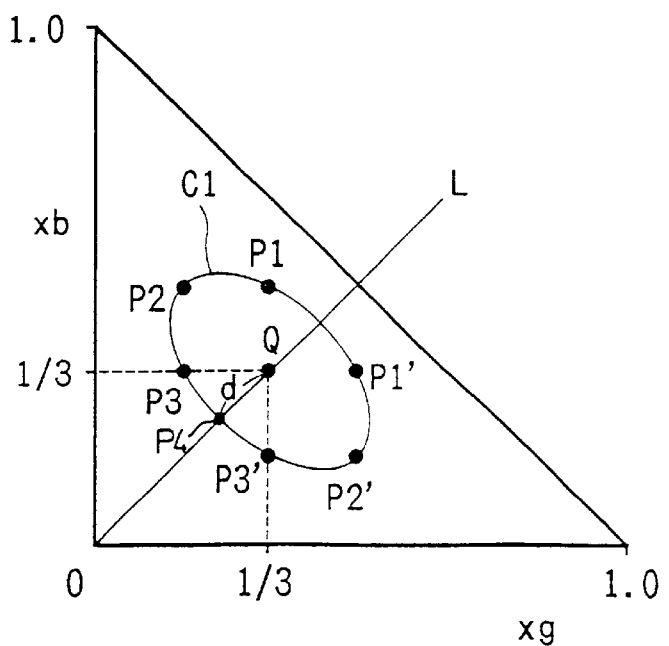
FIG. 20 is a chart showing an elliptical equidistant line generated from 6 normalized data having their components interchanged in the xb–xg plane.
Figure 21:
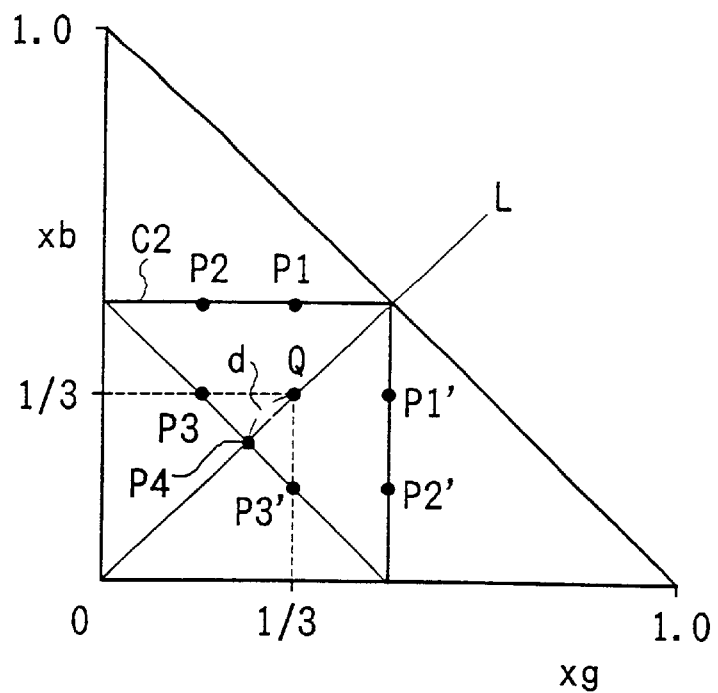
FIG. 21 is a chart showing an isosceles-triangular equidistant line generated from 6 normalized data having their components interchanged in the xb–xg plane.
Figure 22:
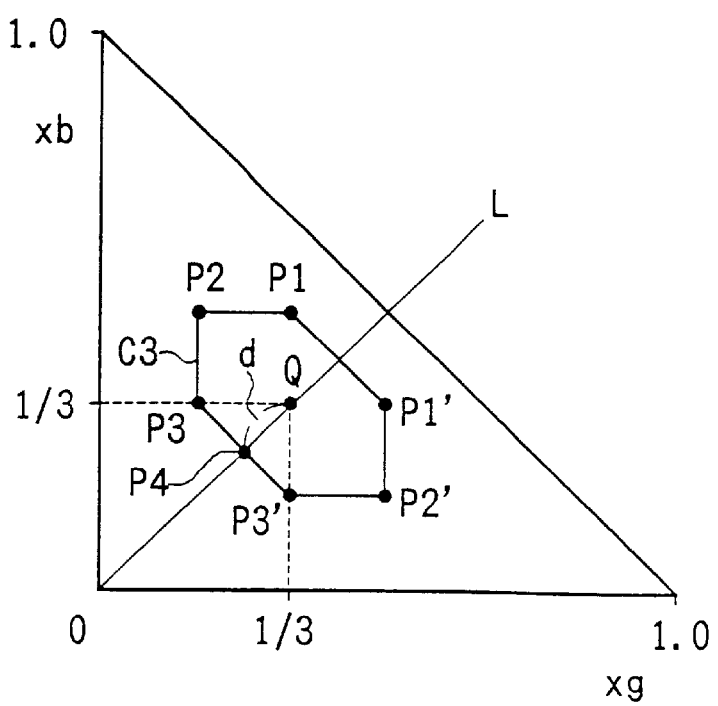
FIG. 22 is a chart showing a hexagonal equidistant line generated from 6 normalized data having their components interchanged in the xb–xg plane.

In the examples of FIGS. 20 to 22, a distance between the respective equidistant lines and the achromatic color point Q (1/3, 1/3) may be, for example, a distance d between an intersection P4 of the straight line L and the equidistant line C1, C2, C3 and the point Q. This distance d is a distance between a center Q of the ellipse C1 to a closest point (1/2 of the minor axis) if the ellipse C1 is adopted as the closed curve, and a distance between the point Q and a midpoint of a hypotenuse if the isosceles triangle C2 is adopted as the close curve.

Although the equidistant lines C2, C3 differ, the distance d from the point Q is same since the hypotenuse passing the points P3, P3, are identical. Accordingly, the equidistant lines C2, C3 are practically identical in considering the distance information.

In this embodiment, a calculation table for directly calculating the distance information d from the normalized data (xb, xg) is provided. Thus, when the normalized data (xb, xg) is calculated, the distance information d can directly be calculated using the calculation table.

Referring back to FIG. 15, in the threshold profile shown therein, an area between the achromatic color position and the distance information d1 is assumed to be an achromatic area Sw. A black-or-white discrimination threshold value is a fixed value Y2 in this achromatic area Sw. Outside this area Sw, a chromatic-or-black discrimination threshold value is a fixed value Y2 and a chromatic-or-white discrimination threshold value is a fixed value Y3 (Y1<Y2<Y3).

In this threshold profile, the luminance level Y and a threshold value Y2 are compared if the position of the normalized data (xb, xg) is located within the equidistant line of the distance information d1 (d≦d1). The image is discriminated to be white if Y≧Y2, while being discriminated to be black if Y<Y2. If the position of the normalized data (xb, xg) is located outside the equidistant line of the distance information d1 (d>d1), the luminance level Y is compared with threshold values Y1, Y3. The image is discriminated to be white if Y>Y3, black if Y<Y1, and a chromatic color if Y3≦Y≦Y1. In the case of a chromatic color, the color of the image is discriminated to be, for example, blue, green, orange or red based on the position of the normalized data (xb, xg) as described above.

The threshold profile shown in FIG. 16 differs from the one shown in FIG. 15 in that the threshold values for the chromatic-white-black discrimination when the normalized data (xb, xg) is located outside the equidistant line of the distance information d1 are increased by two from Y1, Y3 to Y1, Y3, Y4, Y5 (Y3>Y4>Y1>Y5>Y2). According to this threshold profile, when the normalized data (xb, xg) is located between the equidistant line for the distance information d1 and an equidistant line for a distance information d2 (d2>d>d1), the color is discriminated to be white if Y>Y4; is discriminated to be black if Y<Y5; and is discriminated to be a chromatic color if Y4≧Y≧Y5. Further, when the normalized data (xb, xg) is located between the equidistant line for the distance information d2 and an equidistant line for a distance information d3 (d3>d>d2), the color is discriminated to be white if Y>Y3; is discriminated to be black if Y<Y5; and is discriminated to be a chromatic color if Y3≧Y≧Y5. Furthermore, when the normalized data (xb, xg) is located beyond the equidistant line for the distance information d3, the color is discriminated to be white if Y>Y3; is discriminated to be black if Y<Y2; and is discriminated to be a chromatic color if Y3≧Y≧Y2.

The threshold profile shown in FIG. 17 differs from the one shown in FIG. 16 in that the threshold value for the chromatic-white discrimination is linearly changed from Y1 to Y3 when the normalized data (xb, xg) is located between the equidistant line for the distance information d1 and the equidistant line for the distance information d2, and the threshold value for the chromatic-black discrimination is linearly changed from Y1 to Y2 when the normalized data (xb, xg) is located between the equidistant line for the distance information d1 and the equidistant line for the distance information d3.

The threshold profile shown in FIG. 18 differs from the one shown in FIG. 16 in that the threshold value for the chromatic-white discrimination is nonlinearly increased (monotone increase) from Y1 to Y3 when the normalized data (xb, xg) is located between the equidistant line for the distance information d1 and the equidistant line for the distance information d2, and the threshold value for the chromatic-black discrimination is nonlinearly decreased (monotone decrease) from Y1 to Y2 when the normalized data (xb, xg) is located between the equidistant line for the distance information d1 and the equidistant line for the distance information d3.

It should be noted that the typical threshold profiles are shown in FIGS. 15 to 18 and that any other desired profile may also be adopted.

Figure 23:
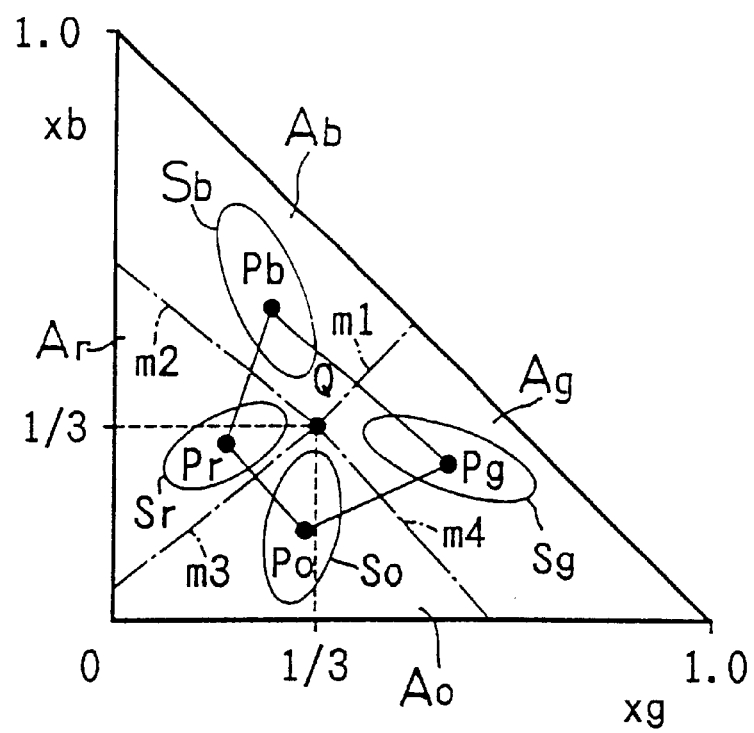
FIG. 23 is a chart showing the xb–xg plane divided into color areas of blue, green, orange and red.

In the case that the color discrimination with respect to blue, green, orange red is performed based on the position of the normalized data (xb, xg) in the xb–xg plane in the threshold profiles shown in FIGS. 15 to 18, dividing lines m1, m2, m3, m4 are set based on the ellipses Sb, Sg, So, Sr to divide the triangular xb–xg plane into four areas Ab, Ag, Ao, Ar as shown in FIG. 23. The color discrimination is performed as to in which of the four areas Ab, Ag, Ao, Ar (excluding the area Sw) the normalized data (xb, xg) is located. For example, if the normalized data (xb, xg) is located in the area Ab, the color in the pixel position is discriminated to be a bluish color, and if it is located in the area Ag, the color in the pixel position is discriminated to be a greenish color.

The dividing lines m1, m2, m3, m4 are set by the color area calculator 32. Assuming that points Pb, Pg, Po, Pr in FIG. 23 are coordinates of the color registered normalized data or those of the normalized data of the preset image data (default values) of blue, green, orange and red, bisectors of ∠PbQPg, ∠PgQPo, ∠PoQPr, ∠PrQPb or medians connecting the point Q of ΔPbQPg, ΔPgQPo, ΔPoQPr, ΔPrQPb and midpoints of the sides of these triangles opposite to the point Q may, for example, set as the dividing lines m1, m2, m3, m4. Since the colors to be discriminated can arbitrarily be set in the four ranges of blue, green, orange, red in the electronic camera 1 as described above, three dividing lines m1, m2, m3 are set for three colors: blue, green, red which are set on if orange is set off in the color use row of the color recognition indicator 17 as in the example of FIG. 3, and the color discrimination is performed with respect to these three colors. In such a case, a bisector of ∠PgQPr or a median connecting the point Q and the side of ΔPgQPr opposite from the point Q is set as the dividing line m3.

The color discriminating circuit 225d performs the color discrimination using the preset threshold profile fixedly if the pattern result inputted from the shape recognizing circuit 255c is constant. However, if the pattern result inputted from the shape recognizing circuit 255c varies, the color discriminating circuit 225 performs the color discrimination for a corresponding area using a threshold profile obtained by entirely or partially shifting the preset threshold profile upward and downward depending on a change in the pattern result. This is to obtain an image having a suitable line width regardless of a variation in line width by entirely or partially shifting the threshold profile upward and downward according to the line width of the characters and the like.

Figure 24:
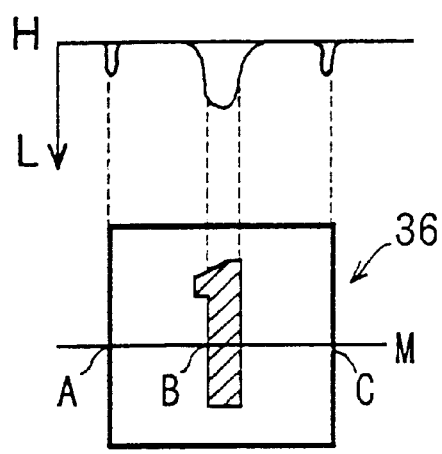
FIG. 24 is a chart showing a relationship of line widths of a character, etc. and a luminance level.

FIG. 24 is a diagram showing an exemplary variation of density level due to a difference in line width.

FIG. 24 shows a density level of the image data on a straight line M of a character portion 36 corresponding to a number "1" enclosed by a rectangle of the white board photographed image. A graph drawn above the character portion 36 indicates the density level. Portions A, C of the straight line M are portions (thin-line portions) corresponding to the line width of the rectangle, and a portion B thereof is a portion (thick-line portion) corresponding to the line width of the number "1". The density levels of the portions A, C is higher than that of the portion B since the portions A, C are thin-line portions and the portion B is a thick-line portion. In other words, the thin-line portions are more white than the thick-line portion.

FIG. 25 shows the black-white discrimination applied to the image on the straight line M of FIG. 24 using a threshold profile.

Figure 25A:
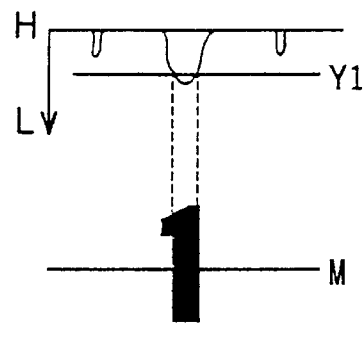
Figure 25B:
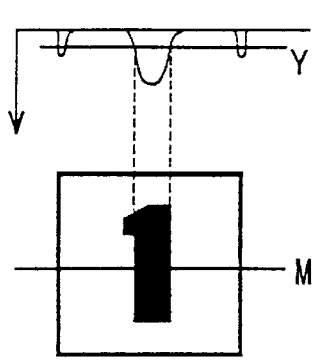
Figure 25C:
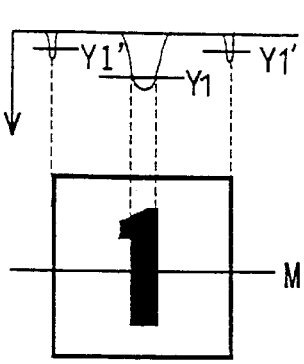
Figure 26:
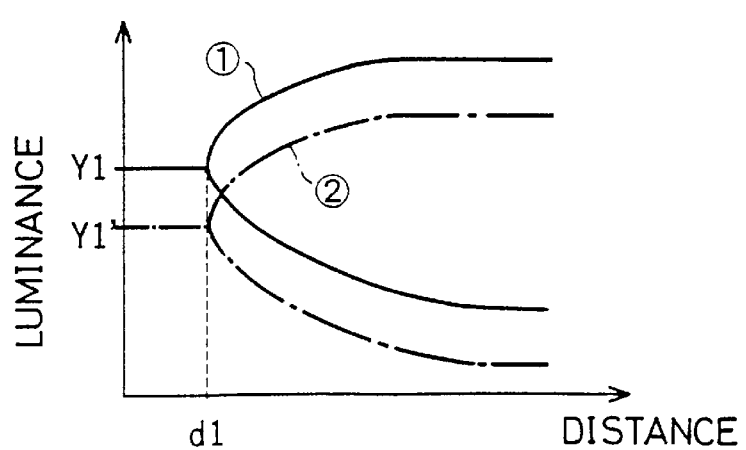
FIG. 26 is a graph showing an exemplary correction of the threshold profile according to the line width.

Assuming that the threshold profile as shown in FIG. 18 is used, FIG. 25A shows the black-white discrimination using a threshold profile ① having a higher threshold level, FIG. 25B shows the black-white discrimination using a threshold profile ② having a lower threshold level, and FIG. 25C shows the black-white discrimination properly using both threshold profiles ①, ② according to the line width.

If the threshold profile ① having a higher threshold level is used, the thick-line portion B has a suitable line width, but the thin-line portions A, C are mistakenly discriminated to be white since they are higher than the threshold level Y1, with the result that the rectangle disappears from the image. On the other hand, if the threshold profile ② having a lower threshold level is used, the thin-line portions A, C have a suitable line width, but the thick-line portion B has a line width thicker than necessary since the image data of an outline is lower than a threshold level Y1'. As can be seen from this example, a fixed threshold profile may often be proper to one line width, but improper to other line widths if different line widths exist. Therefore, it is difficult to properly perform the black-white discrimination regardless of the line widths using the fixed threshold profile.

In view of the above, the line widths are discriminated as shown in FIG. 25C, and suitable line widths can be obtained by switching the threshold profiles ①, ② according to the discrimination result. Accordingly, the color discriminating circuit 225d performs the black-white discrimination using the threshold profile ① if the discrimination result inputted from the shape recognizing circuit 255c is a pattern α while using the threshold profile ② if it is a pattern β.

The correction of the threshold profile in the black-white discrimination may be made by switching a plurality of preset threshold profiles according to the discriminated line width, or may be made by entirely or partially shifting a standard threshold profile upward and downward according to the discriminated line width.

Referring back to FIG. 6, the black area correcting device 256 corrects a black area mistakenly discriminated to include chromatic color(s) into a uniform black area.

In the case that the color discrimination is performed using the threshold profiles shown in FIGS. 15 to 18, relatively dense chromatic colors (i.e., chromatic colors having low luminances) and relatively light chromatic colors (i.e., chromatic colors having high luminances) are likely to be mistakenly discriminated to be white and black, respectively, if the distance information d1 as a threshold value for the achromatic-chromatic color discrimination is set high. Thus, it is desirable to set the distance information d1 low in order to prevent such an error discrimination.

Figure 27:
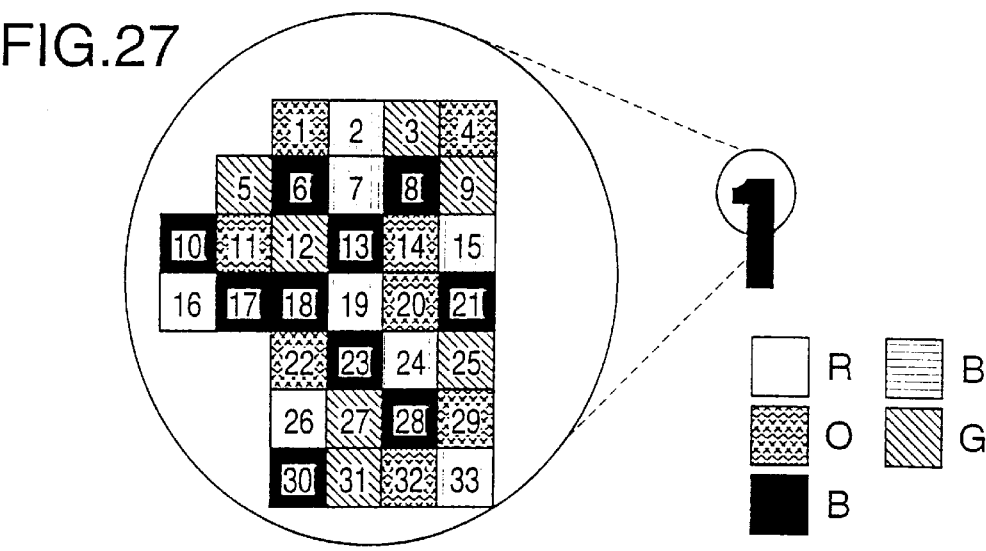
FIG. 27 is a diagram showing an example of a case where the color discrimination result is patched with different colors.

However, if the threshold profile having the distance information d1 set low is used, black is mistakenly discriminated to be chromatic colors and, accordingly, an area supposed to be uniformly black becomes an area patched with chromatic colors as shown in FIG. 27. The black area is likely to become a patched area for the following reasons. Since the black image data has a low level, a ratio xb/xg of the normalized data xb, xg becomes equal to 1 with little likelihood, and the position of the normalized data (xb, xg) is likely to be located outside the achromatic color area Sw. Further, if the image data become black on the average in a relatively large area, there is a high probability that pixel positions where black is mistakenly discriminated to be red, green, orange or the like exist near a pixel position, for example, where black is mistakenly discriminated to be blue.

When a relatively large black area constituting the character, graphic or the like becomes a patched area, the image becomes considerably difficult to see. The black area correcting device 256 is designed to reduce an image defect caused by the patched area by converting the patched area into a black area, and is provided with an isochromatic pixel counting circuit 256a, a dispersion degree calculating circuit 256b and a black discriminating circuit 256c.

Figure 28A:
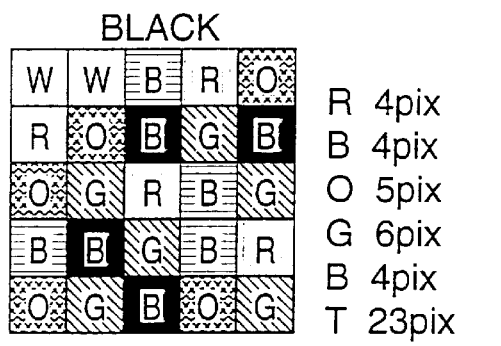
Figure 28B:
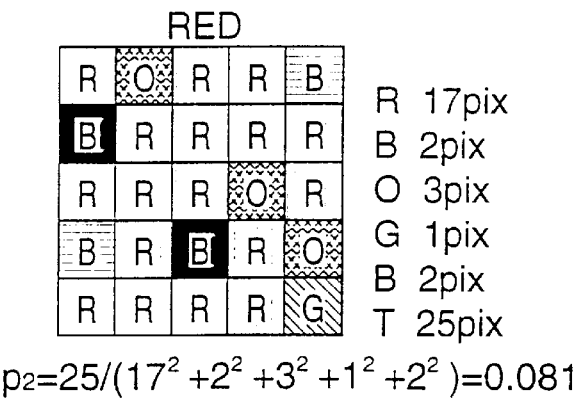

The isochromatic pixel counting circuit 256a counts the number of isochromatic pixels within a block. If the block is constituted by 5×5 pixels and the color distribution of the block is, for example, as shown in FIGS. 28A, 28B, the isochromatic pixel counting circuit 256a counts the number of pixels within the block for each of red, blue, orange, green, black. If Nr, Nb, No, Ng, Nbk, Nt denote the numbers of red, blue, orange, green and blue pixels and a sum of these pixels, respectively, the circuit 256a counts: Nr=4, Nb=4, No=5, Ng=6, Nbk=4, Nt=23 for the example of FIG. 28A while counting: Nr=17, Nb=2, No=3, Ng=1, Nbk=2, Nt=25 for the example of FIG. 28B. Although the block includes two white pixels in the example of FIG. 28A, these white pixels are ignored in the black area correction.

The dispersion degree calculating circuit 256b calculates a degree of dispersion p of each block using the numbers of pixels of the respective colors Nr, Nb, No, Ng, Nbk and the sum Nt of these pixels. The degree of dispersion p is calculated by p=(the number of pixels excluding white pixels)/$\Sigma$(the number of pixels of each color)$^2$=Nt/(Nr$^2$+Nb$^2$+No$^2$+Ng$^2$+Nbk$^2$). It should be noted that the degree of dispersion p is an inverse of the calculation equation for the dispersion. P=23/4$^2$+4$^2$+5$^2$+6$^2$+4$^2$)=0.211 in the example of FIG. 28A and p=25(17$^2$+2$^2$+3$^2$+1$^2$+2$^2$)=0.081 in the example of FIG. 28B.

The black discriminating circuit 256c discriminates whether or not the pixel in the center position of each block is black using the degree of dispersion p calculated in the dispersion degree calculating circuit 256b. Specifically, the circuit 256c compares the degree of dispersion p with a preset threshold value K1, and discriminates the pixel to be black if p>K1 while discriminating to be a chromatic color if p$\leq$K1. For example, if K1=0.1, the pixel in the center position is discriminated to be black in the example of FIG. 28A while being discriminated to be a chromatic color in the example of FIG. 28B. Since there are an overwhelmingly large number of red pixels in the example of FIG. 28B, the pixel in the center position can be discriminated to be "red".

Figure 29:
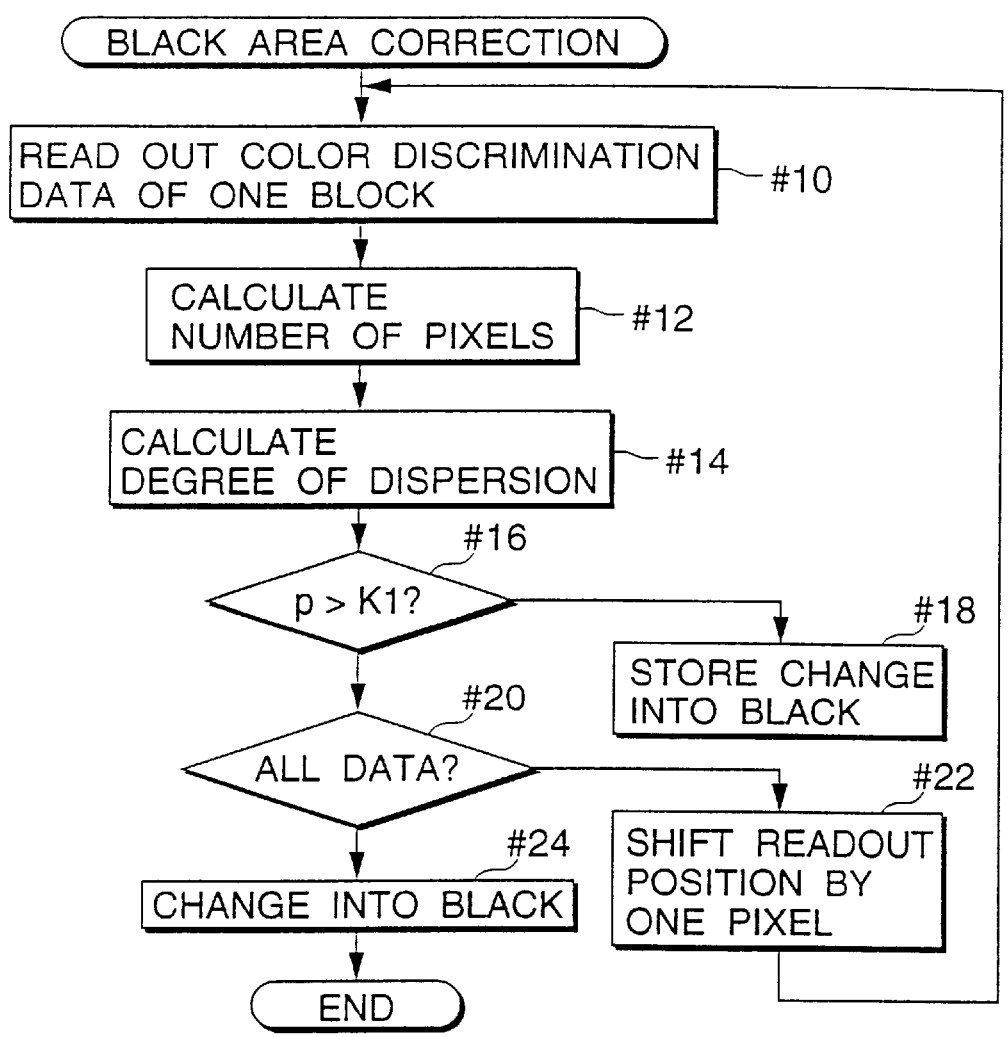
FIG. 29 is a flowchart showing a procedure of a correction performed by a black area correcting device.

FIG. 29 is a flowchart showing the correction procedure in the black area correcting device 256.

The color discrimination result outputted from the color discriminating circuit 255 is stored in an unillustrated memory in the black area correcting device 256 and the black area correction is performed in accordance with a flowchart of FIG. 29. Specifically, the color discrimination data of one block (5×5 pixels) at an upper left corner of the memory are read out (Step #10), and the numbers of the pixels of each color except white and the sum of these pixels are calculated (Step #12). If the discrimination colors are red, blue, orange, green and black, the numbers of pixels Nr, Nb, No, Ng, Nbk and the sum Nt are counted.

Subsequently, the degree of dispersion p (=Nt/(Nr$^2$+Nb$^2$+No$^2$+Ng$^2$+Nbk$^2$)) is calculated (Step #14), and whether or not the pixel in the center position of the block is black is discriminated by comparing the degree of dispersion p with the predetermined threshold value K1 (Step #16). If p>K1 (YES in Step #16), a change of the color discrimination data in the pixel position in the center of the block (3$^{rd}$ pixel position in the 3$^{rd}$ row of the block) into a black data is stored (Step #18). On the other hand, if p$\leq$K1 (NO in Step #16), the above data change is not instructed.

Subsequently, it is discriminated whether or not the above processing has been applied to all color discrimination data (Step #20). If the processing has not been completed (NO in Step #20), the readout position of the block is horizontally shifted by one pixel (Step #22), this routine returns to Step #10 and the above black discrimination is performed (Steps #10 to #20). Hereafter, the black discrimination is applied to the color discrimination data in each pixel position while shifting the readout position of the block in a raster direction pixel by pixel (a loop of Steps #10 to #22). If the black discrimination for all color discrimination data is completed (YES in Step #20), the color discrimination data in the pixel positions where an instruction is given to change the color discrimination data into black data is changed into black data (Step #24), thereby ending the processing.

Although the size of the block used for the black area correction is 5×5 pixels in this embodiment, it is not limited thereto, but an arbitrary suitable size can be set in consideration of a processing accuracy and a processing speed. Further, although the degree of dispersion p is defined as a parameter for measuring how much colors are dispersed, an other operation equation may be defined provided it can express a color variation. For example, a standard deviation $\sigma=1/\sqrt{(p)}$ may be used.

Alternatively, in the case that the respective colors of blue, green, orange, red, black are expressed as vectors such as (0,1,0,0), (0,0,1,0), (0,0,0,1), (1,0,0,0), (1,1,1,1), an inverse of an average vector length within the block may represent the degree of dispersion. It should be noted that the vectors may express the respective individual colors or may have an added information such as "red and orange are approximate colors". Further, a vector space is not limited to a four-dimensional space, but may be a space of any desired dimensions.

As a simple method, how many colors exist in 8 pixel positions neighboring the center position of the block is detected and the degree of color mixedness is judged based on the number of different colors.

The second noise eraser 257 corrects the chromatic colors and white (mistakenly discriminated colors) included in the color-discriminated black area into black. Even if the patched areas are corrected into black areas by the black area correcting device 256, there are cases where chromatic colors still remain in the black area in an isolated manner. The second noise eraser 257 erases these pseudo colors by converting them into black.

Figure 30:
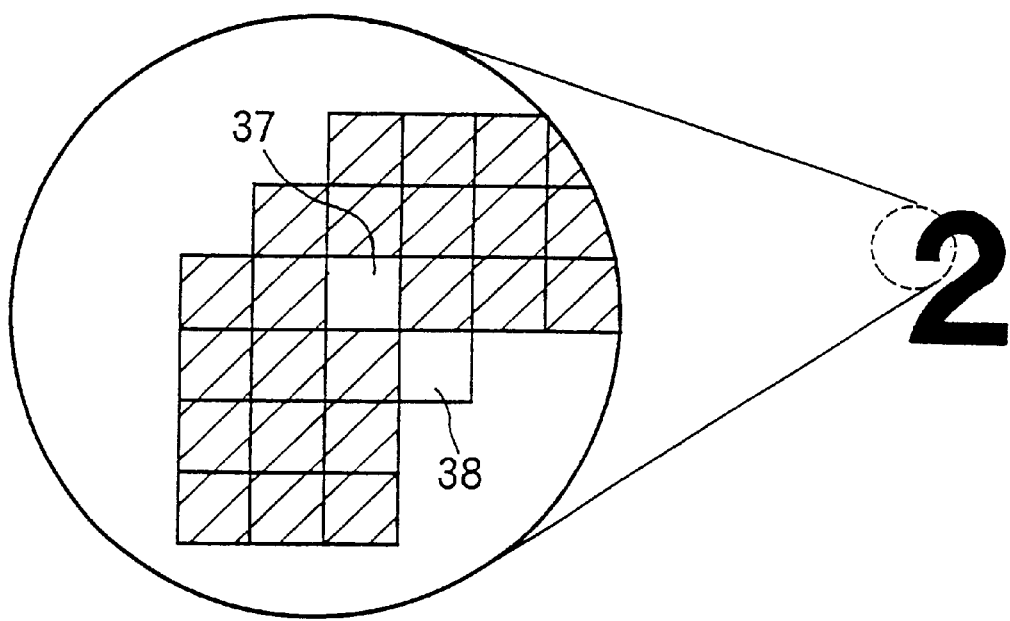
FIG. 30 is a diagram showing an example where a black area of a character is spotted with chromatic portions.

FIG. 30 shows an example of a state where chromatic color remain in a black area of a character or the like in an isolated manner.

In FIG. 30, chromatic pixels 37, 38 remain in a black area constituting a number "2". The second noise eraser 257 erases the pseudo color by converting the pixel 37 in the black area into black. It should be noted that no black correction is applied to the pixel 38 located in the outline of the black area constituting the number "2". If a color other than black remains in the black area in an isolated manner, this color stands out, making the character difficult to see. If a color other than black is located on the boundary of the black area, this pseudo color causes a problem to a small degree. Thus, in view of a delay in the processing speed due to the black area correction, the black correction is applied only to the pseudo color surrounded by the black area. The black correction may also be applied to the pseudo color on the boundary of the black area.

Figure 31:
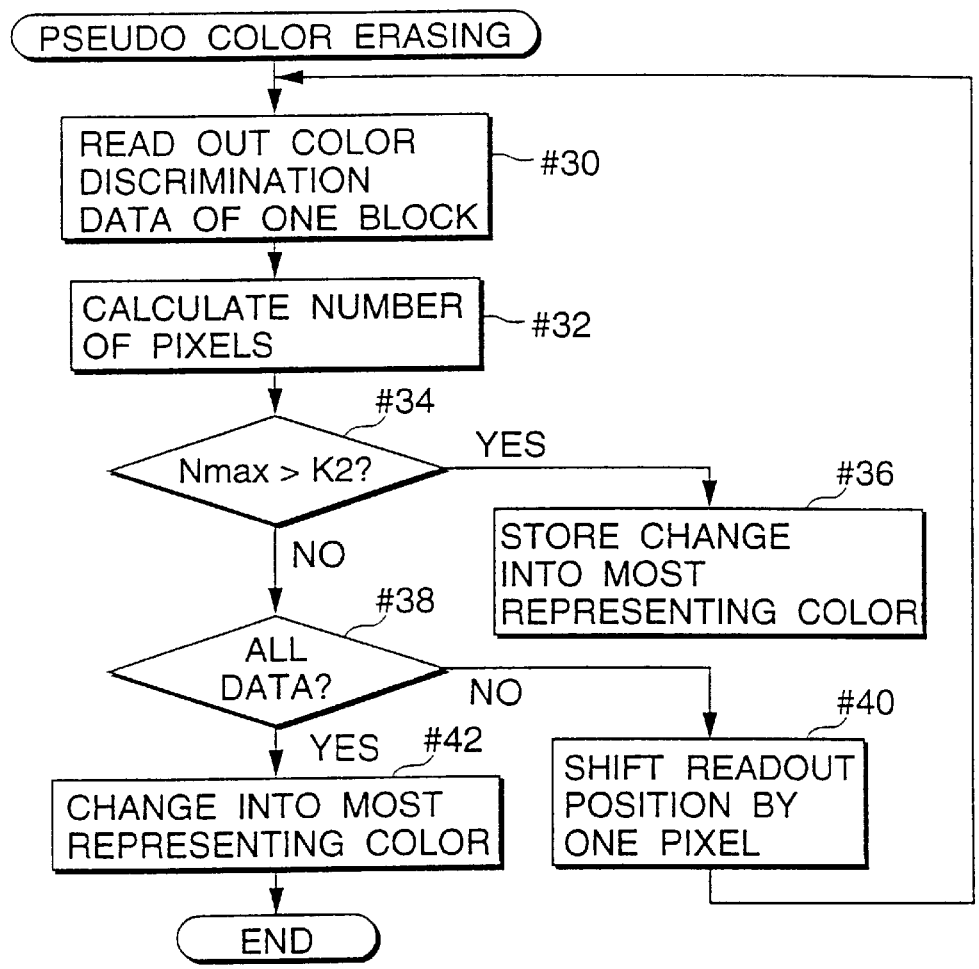
FIG. 31 is a flowchart showing a procedure of a pseudo color erasing operation performed by a second noise erasing circuit.

FIG. 31 is a flowchart showing a pseudo color erasing procedure performed by the second noise eraser 257.

Figure 32:
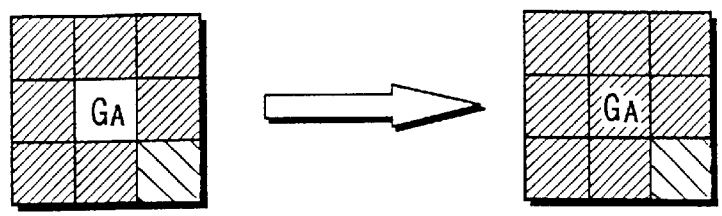
FIG. 32 is a diagram showing a method for correcting the color of a center pixel using the color discrimination results for 8 neighboring pixel positions.

The flowchart shown in FIG. 31 is implemented to check the color of a center position pixel $G_A$ and its 8 neighboring pixels and to, if the number of pixels of the same color exceeds a predetermined number K2, change the color of the center position pixel $G_A$ into the color of the pixels exceeding the predetermined number K2 as shown in FIG. 32. In FIG. 32, the predetermined number K2 is set at 6, and the color of the center position pixel $G_A$ is changed to black since 7 pixels excluding the center and lower right corner pixels are black.

The color discrimination data outputted from the black area correcting device 256 are stored in the unillustrated memory in the second noise eraser 257, and the black area is corrected in accordance with the flowchart of FIG. 31. Specifically, the color discrimination data of one block (3×3 pixels) at an upper left corner are first read from the memory (Step #30) and the number of pixels within the block is counted for each color (Step #32).

Subsequently, a number Nmax of the pixels of the most representing color is compared with the predetermined threshold value K2 to discriminate whether Nmax>K2 (Step

34). If Nmax>K2 (YES in Step #34), a change of the color discrimination data in the center pixel position ($2^{nd}$ pixel position of the $2^{nd}$ row of the block) of the block into the most representing color is stored (step #36). On the other hand, if Nmax≦K2 (NO in step #34), the above data change is not instructed.

Subsequently, it is discriminated whether the pseudo color correction has been applied to all color discrimination data (Step #38). If the processing has not been completed (NO in Step #38), the readout position of the block is horizontally shifted by one pixel (Step #40), this routine returns to Step #30 and the above pseudo color correction is performed (Steps #30 to 38). Hereafter, the pseudo color correction is applied to the color discrimination data in each pixel position while shifting the readout position of the block in a raster direction pixel by pixel (a loop of Steps #30 to #40). If the pseudo color correction for all color discrimination data is completed (YES in Step #38), the color discrimination data in the pixel positions where an instruction is given to change the color discrimination data into data of the most representing color is changed into data of the most representing color (Step #42), thereby ending the processing.

Referring back to FIG. 6, the color replacer 258 replaces the image data in the respective pixel positions by the image data of the corresponding colors (image data of color components R, G, B) preset based on the color data set by the color discriminating circuit 255, the black area correcting device 256 and the second noise eraser 257 or set by the color registration. The image data replaced by the color replacer 258 are outputted to the HD card 10 to be stored therein (see FIG. 5).

Figure 34:
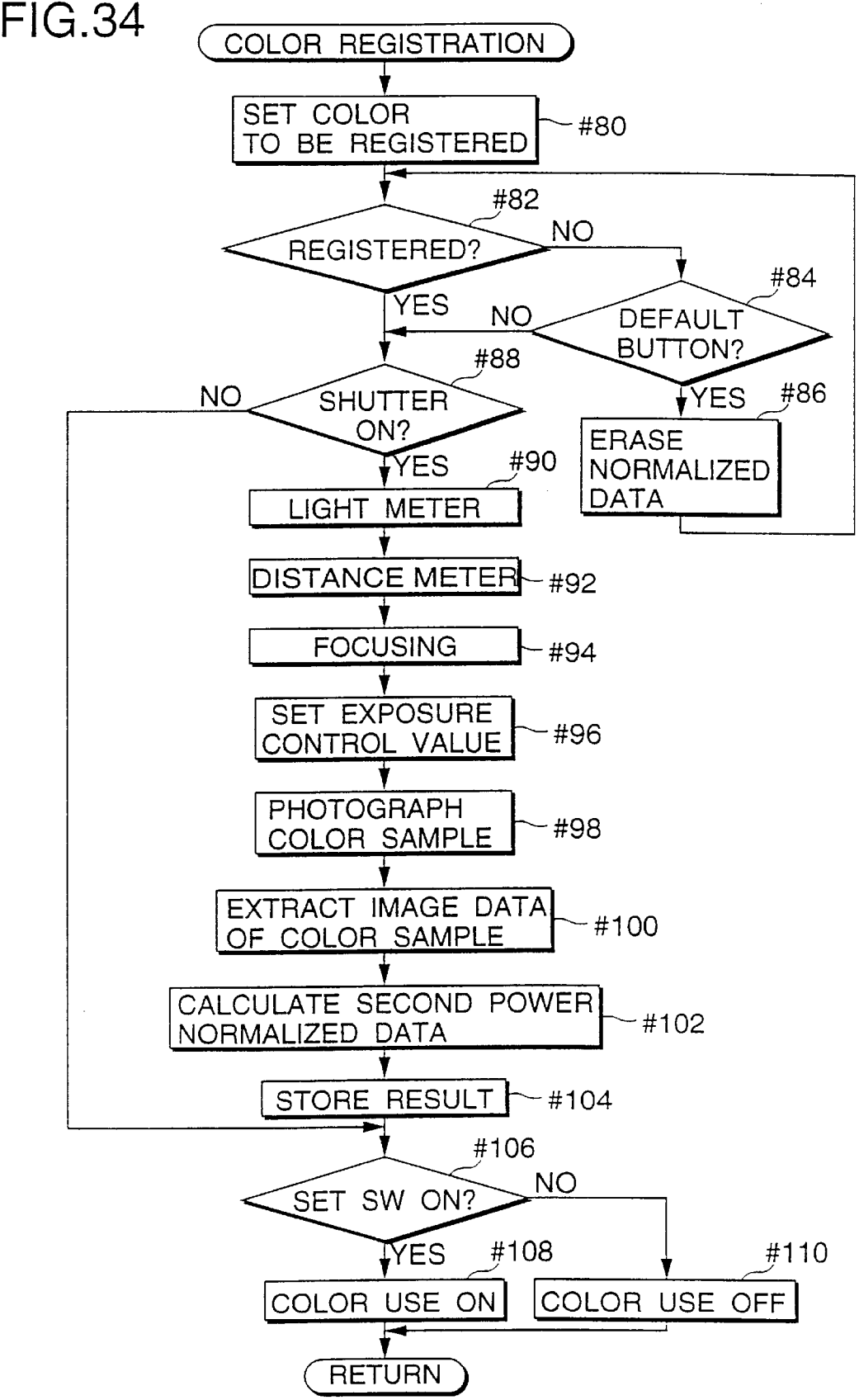
FIG. 34 is a flowchart showing a color registration.
Figure 35:
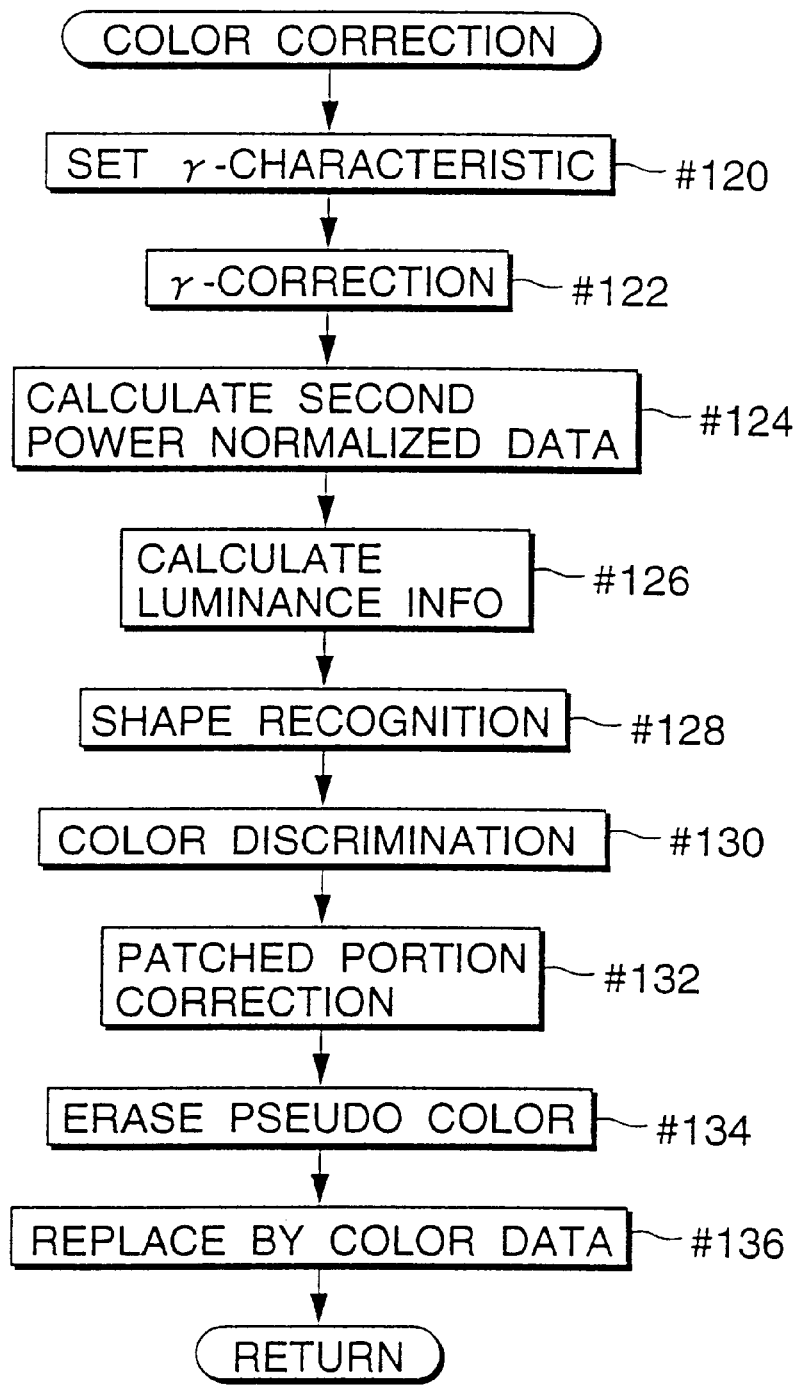
FIG. 35 is a flowchart showing a color correction.
Figure 36:
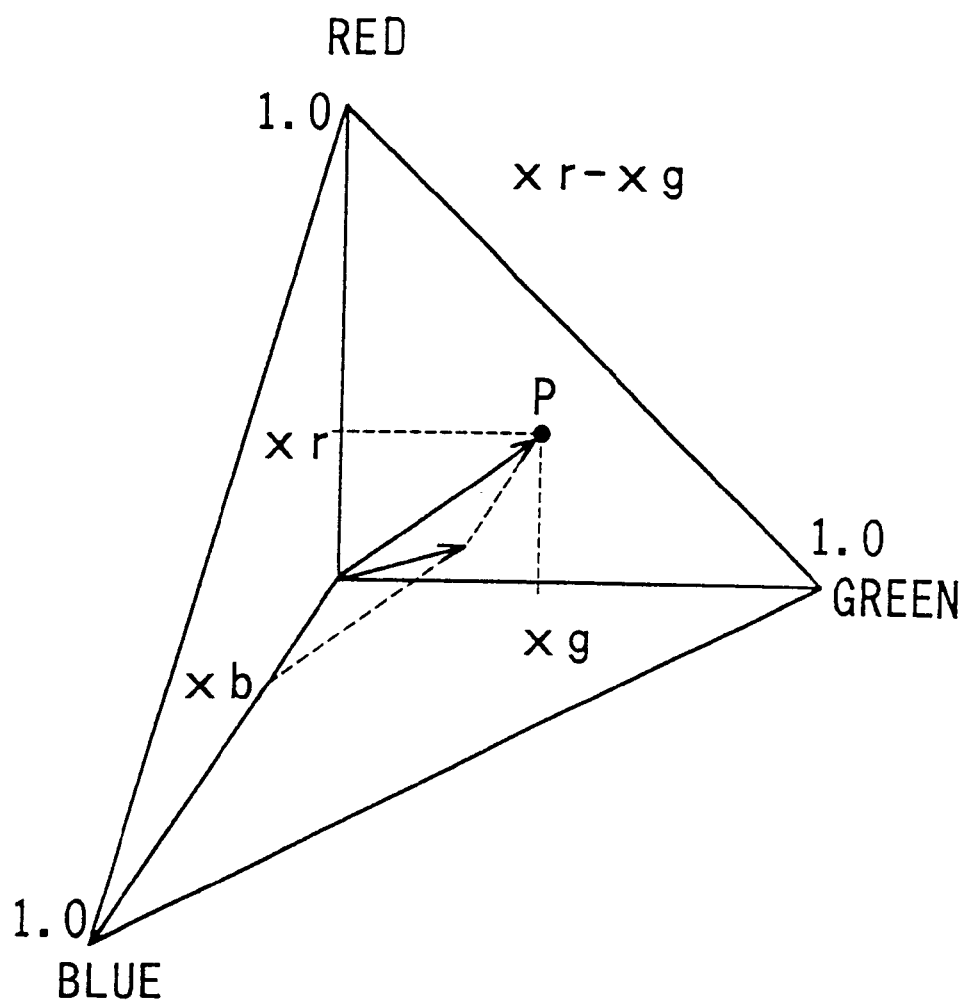
FIG. 36 is a diagram showing a conventional color discrimination.

Next, the photographing operation of the electronic camera 1 is described with reference to flowchart of FIGS. 33 to 35.

Figure 33:
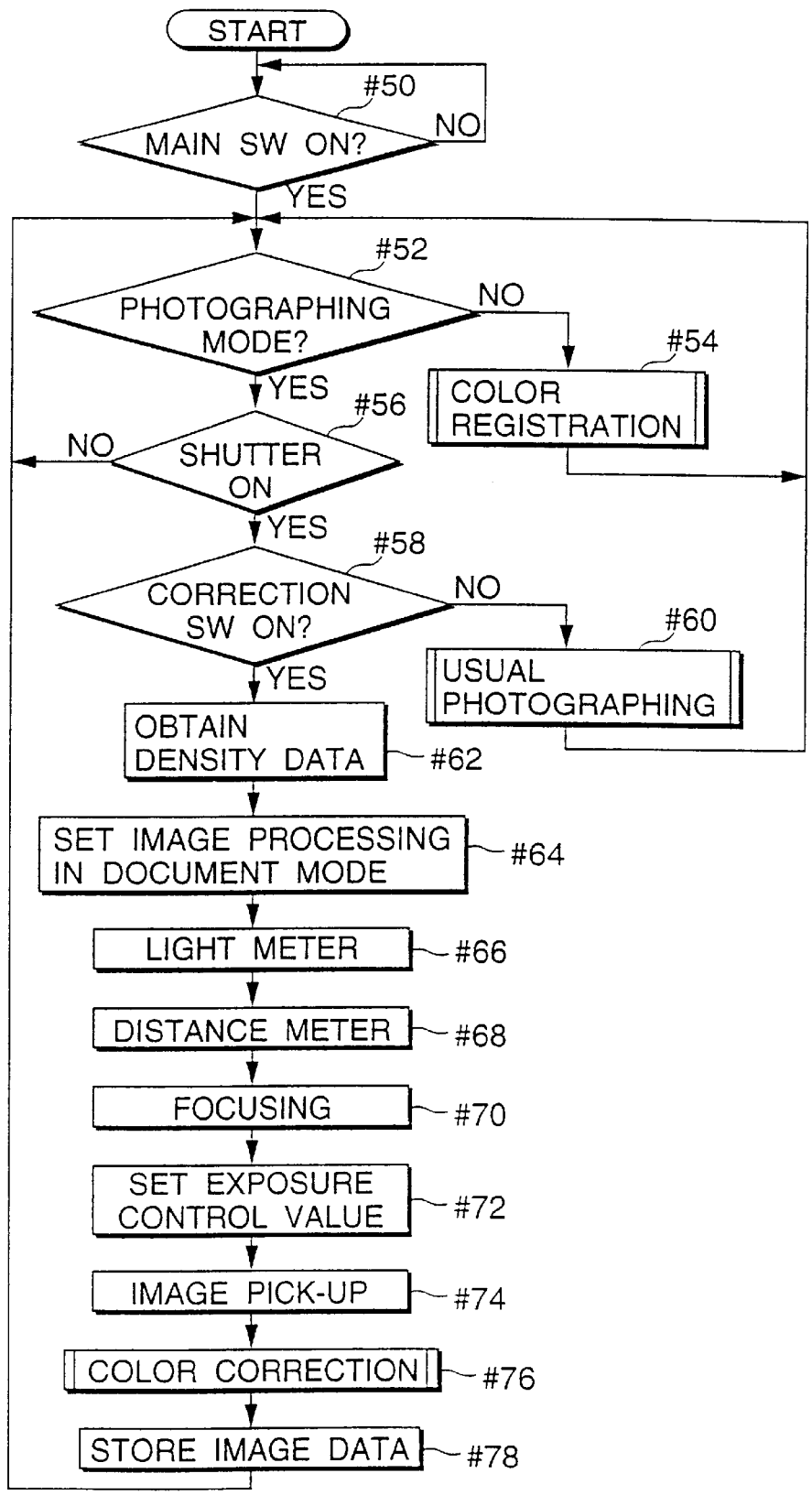
FIG. 33 is a flowchart showing a photographing operation in the document mode of the electronic camera.

FIG. 33 is a flowchart showing a procedure of the photographing operation in the document mode.

When the main switch 11 is turned on (YES in Step #50), the electronic camera 1 is activated, bringing it into a photographing enabled state. First, it is discriminated whether the mode changeover switch 16 is set in the photographing mode (Step #52). If the photographing mode is not set, i.e., the color registration mode is set (NO in Step 52), the color registration is performed in accordance with the flowchart of FIG. 34. If the photographing mode is set (YES in Step #52), the color registration is started in Step #54.

Upon entering the color registration, the colors designated by the color selection button 18 are set as colors to be registered (Step #80). The colors to be registered are discriminated and set by the display position of the bar indicator 171. It is then discriminated whether the set color is already registered based on the presence or absence of the circle indicator 172 (Step #82). If the set color is not yet registered (NO in Step #82), it is discriminated whether the data erasure of the registered color has been instructed by the default button 20 (Step #84).

If the data erasure of the registered color has been instructed (YES in Step #84), a preset default value of the registered color is written over the second power normalized data of this color stored in the RAM 27 (Step #86) and this subroutine returns to Step #82. On the other hand, if the data erasure of the registered color has not been instructed (NO in Step #84), Step #88 follows.

If the set color is not registered (YES in Step #82), it is discriminated whether the photographing of the color sample (see FIG. 4) has been instructed by the release operation of the shutter button 9 (Step #88). If the photographing has been instructed (YES in Step #88), the luminance of the object is detected by the light meter 30 (Step #90) and the focusing is performed based on the detected object luminance (Step #94). Further, exposure control values (an aperture value and a charge storing time of the CCDs) are set using the detected object luminance (#96).

Subsequently, the color sample is photographed based on the set exposure control values (Step #98). The image data obtained by the image sensing unit 23 has a portion thereof within the frame 21 in the center of the view screen extracted by the set color normalization calculator 31, and the image data of the color sample is further extracted from the extracted image data (Step #100). The second power normalized data is calculated for the image data of the color sample (Step #102), and the calculation result is stored in a specified storage area of the RAM 72 (Step #104).

When the storage of the second power normalized data of the color sample in the RAM 27 (color registration) is completed, it is discriminated whether the color use has been instructed by operating the set button 19 (Step #106). If the color use has been instructed (YES in Step #106), the colors to be used in the color discrimination of the registered colors are set (Step #108) and this subroutine returns. At this time, "on" is circled for the colors to be used in the color use row of the color registration confirmation indicator 17. If the color use has not been instructed (NO in Step #106), the color use in the color discrimination of the registered colors is canceled (Step #110) and this subroutine returns. At this time, "off" is circled for the colors in the color use row of the color registration confirmation indicator 17.

On the other hand, unless the photographing has been instructed (NO in Step #88), Step #106 follows without registering the second power normalized data of the aforementioned color sample by skipping Steps #90 to #104.

As described above, if the default button 20 is operated in the color registration mode, the already registered image data (image data of color components R, G, B) of the color sample for the set color and the second power normalized data thereof are erased, and the preset image data and the second power normalized data (default value) are set instead. Further, if the set button 19 is operated, the color use is set or canceled for the set color. Regardless of whether or the color is already registered, the second power normalized data of the photographed color sample is calculated if the color sample is photographed. The calculated value and the obtained image data are newly or renewably registered.

Referring back to FIG. 33, if the photographing mode is set (YES in Step #52), it is further discriminated whether the photographing has been instructed by the release operation of the shutter button 9 (Step #56). Unless the photographing has been instructed (NO in Step #56), Step #52 follows. If the photographing has been instructed (YES in Step #56), it is discriminated whether the color correction switch 13 is on (i.e., the document mode is set (Step #58).

If the document mode is not set, i.e., the normal mode is set (NO in Step #58), a usual picture-taking operation is performed. In other words, the object luminance and the object distance are detected; the focusing and the setting of the exposure control values are performed based on the detected values; and then the object is photographed. Specified image processings (image processings for providing a highly descriptive image quality) are applied to the image data obtained by the image sensing unit 23 in the image processing unit 25. The processed image data is stored in the HD card 10 after being compressed.

On the other hand, if the document mode is set (YES in Step #58), the density data (dark/light data) is obtained based on the set position of the density set switch 15 (Step #62). Subsequently, the image processing unit 25 is set to the image processing in the document mode and the density data is set in the color discriminating unit 255 (Step #64).

Subsequently, the object luminance is detected by the light meter 30 (Step #66) and the object distance is detected by the distance meter 29 (Step #68). The focusing is performed based on the detected object distance (Step #70). Further, the exposure control values (an aperture value and a charge storing time of the CCDs) are set using the detected object brightness (Step #72).

Subsequently, the object image is picked up by the image sensing unit 23 based on the set exposure control values (Step #74). The image data obtained by the sensing operation is stored in the HD card 10 (Step #78) after a specified color correction is applied thereto in accordance with a flowchart shown in FIG. 35 in the image processing unit 25 (Step #76). In this way, the photographing of one frame is completed and this routine returns to Step #52 for the next photographing.

Upon entering the color correction, the γ-characteristic setter 254 sets the γ-characteristic for the background filtering using the image data stored in the image memory 251 (Step #120). After the image data stored in the image memory 251 has its noises reduced by the first noise eraser 252, the background image is filtered (a processing for converting the white portion of the background image into a uniformly white image) by the γ-correction performed by the background filtering calculating circuit 253 using the γ-characteristic (Step #122).

Subsequently, the second power normalized data for the color discrimination are calculated in the normalization calculating circuit 255a of the color discriminating unit 255, using the image data stored in the image memory 251 (Step #124). The luminance information for the color discrimination is calculated for each pixel position in the luminance calculating circuit 255b of the color discriminating unit 255 using the image data stored in the image memory 251 (Step #126). Further, the shape recognition (a pattern recognition by pattern matching) is performed to recognize the characters, graphics and the like for each specified block in the shape recognizing circuit 255c of the color discriminating unit 255, using the image data stored in the image memory 251 (Step #128). The color in each pixel position is discriminated according to the aforementioned color discrimination method using the preset threshold profile (see FIGS. 15 to 18) based on the second power normalized data, the luminance information and the shape recognition result in the color discriminating circuit 255d of the color discriminating unit 255 (Step #130).

Subsequently, the processing for correcting a patched pattern is applied to the color discrimination data in the black area correcting device 256 (Step #132). After the processing for erasing pseudo color(s) existing in an isolated manner is applied to the color discrimination data (Step #134), the image data (image data obtained by the photographing) in each pixel position is replaced by a specified color data (a preset image data of color components R, G, B or an image data of color components R, G, B registered by the color registration) based on the color discrimination data in the color replacer 258 (Step #136). In this way, the color correction is completed and this subroutine returns.

Although the foregoing embodiment is described taking an electronic camera as an example, the present invention is also applicable to other color image processing apparatuses including, for example, a color discrimination by a computer.

As described above, the color discriminating apparatus for discriminating colors by comparing luminance information with a specified threshold value for each pixel constituting the color image calculates an information on geometric shapes such as lines and surfaces constituting the characters, graphics and the like which are an image content, and changes the discrimination threshold value based on the calculated information. Accordingly, the color of the characters, graphics and the like can suitably be discriminated without being influenced by the variations in the line width and surface size of the characters, graphics and the like. Therefore, there is no likelihood that thin-line and low density characters disappear by the color discrimination and that characters and the like having a normal line width are deformed by the color discrimination.

Also, in the color discriminating apparatus, luminance information and distance information are calculated based on image data of color components. The chromatic-or-achromatic discrimination is performed based on the distance information. In the case of an achromatic color, black-or-white discrimination is performed based on the luminance information. In the case of a chromatic color, it is judged based on the luminance information and the distance information which of preset colors a discriminated color agrees with. Accordingly, an accurate color discrimination can be accomplished easily. In particular, even in the case of chromatic color being discriminated, a chromatic color, black, or white can be discriminated based on the luminance information. This will prevent an achromatic image having a low or high luminance from being wrongly discriminated to be a chromatic color.

Also, the color discrimination is performed based on second power normalized data. Accordingly, more accurate discrimination result can be obtained.

Further, a degree of color dispersion is calculated with respect to a block consisting of a particular pixel and pixels surrounding the particular pixel. When a calculated dispersion degree is larger than a predetermined value, the color of the particular pixel is forcibly changed to black. This will easily and speedily remove or erase chromatic color noises over the true black area.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A color discriminating apparatus comprising:
    a first calculator which calculates luminance information of a color image based on image data including a plurality of color components;
    a second calculator which calculates color information of the color image based on image data;
    a first discriminator which discriminates, based on the color information, whether the color image is chromatic or achromatic;
    a second discriminator which discriminates, based on the luminance information, whether the color image is black or white when the color image is discriminated to be achromatic by the first discriminator; and
    a third discriminator which discriminates, based on the color information and the luminance information, which of a plurality of predetermined colors corresponds with the color image when the color image is discriminated to be chromatic by the first discriminator.

2. A color discriminating apparatus according to claim 1, wherein the color information is calculated based on normalized data of second or higher powers of respective color component image data.

3. A color discriminating apparatus according to claim 1, wherein the plurality of color components includes three primary colors of red, blue, and green.

4. A color discriminating apparatus comprising:
a calculator which calculates normalized data x(i) of image data X(i) (i=1,2, . . . n) for each of a plurality of color components in accordance with the equation:

$$x(i)=X(i)^k/\{X(1)^k+X(2)^k+\ldots X(n)^k\}(k\geq 2),$$

the image data X(i)(i=1,2, . . . n) including color image data for n color components of an image; and
a color discriminator that discriminates the presence or absence of the color within the n color components of the color image based on calculated normalized data.

5. A color discriminating apparatus according to claim 4, wherein the plurality of color components includes three primary colors of red, blue, and green.

6. A color discriminating apparatus comprising:
a luminance information calculator which calculates luminance information of each part of a color image based on image data of a plurality of color components in each of the parts of the color image;
a color discriminator which discriminates the presence or absence of a discriminated color in each part of the color image by comparing calculated luminance information for each part with a discrimination reference;
an area information generator that generates area information related to a geometrical configuration of the color image; and
a changer which changes the discrimination reference based on generated area information.

7. A color discriminating apparatus comprising:
a color discriminator which discriminates a predominant color for each of a selected image section and a plurality of surrounding image sections in a color image based on image data of each of a plurality of color components;
a color dispersion degree calculator which calculates a degree of color dispersion for the selected image section using the predominant color of the selected image section and of the plurality of surrounding image sections;
a color dispersion degree discriminator which discriminates whether the degree of color dispersion is larger than a predetermined value; and
a black allocator which allocates the color of black to the selected image section when the color dispersion degree is discriminated to be larger than the predetermined value.

8. A color discriminating apparatus according to claim 7, wherein the black allocator further allocates the color of black to the plurality of color discriminated parts surrounding the particular part when the color dispersion degree is discriminated to be larger than the predetermined value.

9. A method for discriminating the color of a color image, comprising the steps of:
calculating luminance information of the color image based on image data of the color image including a plurality of color components;
calculating color information of the color image based on the image data;
discriminating, based on the color information, whether the color image is chromatic or achromatic;
discriminating, based on the luminance information, whether the color image is black or white when the color image is discriminated to be achromatic; and
discriminating, based on the color information and the luminance information, which of a plurality of predetermined colors corresponds with the color image when the color image is discriminated to be chromatic.

10. A method according to claim 9, wherein the color information is calculated based on normalized data of second or higher powers of respective color component image data.

11. A method according to claim 9, wherein the plurality of color components includes three primary colors of red, blue, and green.

12. A method for discriminating the color of a color image, comprising the steps of:
calculating normalized data x(i) of image data X(i) (i=1, 2, . . . n) for each of a plurality of color components in accordance with the equation:

$$x(i)=X(i)^k/\{X(1)^k+X(2)^k+\ldots X(n)^k\}(k\geq 2),$$

the image data X(i)(i=1,2, . . . n) including color image data for n color components of the color image; and
discriminating the color of the color image based on calculated normalized data.

13. A method according to claim 12, wherein the plurality of color components includes three primary colors of red, blue, and green.

14. A method for discriminating the color of a color image, comprising the steps of:
calculating luminance information of each part of the color image based on image data of a plurality of color components in each part of the color image;
discriminating the presence or absence of a discriminated color in each part of of the color image by comparing calculated luminance information for each part with a discrimination reference;
generating area information related to a geometrical configuration of the color image; and
changing the discrimination reference based on generated area information.

15. A method for discriminating the color of color image, comprising the steps of:
discriminating a predominant color for each of a selected image section and a plurality of surrounding image sections in the color image based on image data of each of a plurality of color components constituting the selected image section and the plurality of surrounding image sections;
calculating a degree of color dispersion for the selected image section using the predominant color of the selected image section and of the plurality of surrounding image sections;
discriminating whether the degree of color dispersion is larger than a predetermined value; and
allocating the color of black to the selected image section when the color dispersion degree is discriminated to be larger than the predetermined value.

16. A method according to claim 15, wherein the plurality of surrounding image sections is allocated with the color of black when the degree of color dispersion is discriminated to be larger than the predetermined value.

17. A color allocating apparatus comprising:

a calculator which calculates a luminance and a chromatic value with respect to each of pixels composing a color image;

a discriminator which discriminates whether color of the pixel is white, black, or chromatic color based on the calculated luminance and the calculated chromatic value, referring to a predetermined discrimination threshold profile, wherein the discrimination threshold profile allocates black or white to the pixel based on the luminance when the chromatic value is smaller than a predetermined value, and allocates white, chromatic color, or black based on the luminance when the chromatic value is larger than the predetermined value.

18. The apparatus according to claim 17, wherein the chromatic value is calculated based on values (xr, xg, xb) which are respectively obtained by standardizing Xr, Xg, Xb according to the following expressions when the color image is represented in terms of pixel values (Xr, Xg, Xb) respectively related to red, green, blue with respect to each of the pixels:

$$xr=Xr^2/(Xr^2+Xg^2+Xb^2),$$

$$xg=Xg^2/(Xr^2+Xg^2+Xb^2),$$

$$xb=Xb^2/(Xr^2+Xg^2+Xb^2).$$

19. The apparatus according to claim 17, further comprising an allocator which allocates one of predetermined colors to the pixel which is determined to allocate chromatic color according to the standardized values (xr, xg, xb).

20. A color allocating apparatus comprising:

a calculator which calculates a value x(i) (i=1,2, ..., n) which is standardized for each of color components with respect to each of the pixels according to the following expression based on image data which is represented in terms of a plurality of color component values X(i) (i=1, 2, ..., n) with respect to each of the pixels:

$$x(i)=X(i)^k/\{X(i)^k+X(2)^k+ \ldots +X(n)^k\}(k \geq 2),$$

and an allocator which allocates one of predetermined colors with respect to each of the pixels based on the calculated standardized value x(i).

21. A color allocating apparatus comprising:

a configuration discriminator which discriminates whether a part constituting a color image is configured by a bold line having a width not smaller than a predetermined reference value or a thin line having a width smaller than the predetermined reference value;

a color discriminator which discriminates whether color of a pixel is white, black, or chromatic color according to a threshold value of the discriminated part based on a predetermined threshold value; and an adjuster which changes the threshold value for discrimination by the color discriminator according to the configuration discriminated by the configuration discriminator.

22. The color allocating apparatus according to claim 21, wherein said part corresponds to one pixel, and the configuration discriminator and the color discriminator make judgement with respect to each pixel of an image.

23. A color allocating apparatus comprising:

an allocator which allocates an allocated color from one of a predetermined plurality of colors that is close to the color of a pixel for each pixel of a color image;

a calculator which calculates a variation degree of the allocated color in a partial area composing a plurality of pixels in the color image; and a re-allocator which reallocates the color of a target pixel corresponding to the partial area to black when it is judged that the variation degree is large.

24. The color allocating apparatus according to claim 23, wherein the target pixel is a pixel in the center of the partial area.

25. The color allocating apparatus according to claim 23, wherein the re-allocator reallocates the color of the plurality of pixels composing the partial area to black when it is judged that the variation degree is large.

* * * * *